US012653091B2

(12) United States Patent
Barry et al.

(10) Patent No.: US 12,653,091 B2
(45) Date of Patent: Jun. 16, 2026

(54) SEED TUBE GUARD AND ASSOCIATED SYSTEMS AND METHODS OF USE

(71) Applicant: Ag Leader Technology, Ames, IA (US)

(72) Inventors: Alan F. Barry, Nevada, IA (US); Nick Schwartz, Story City, IA (US)

(73) Assignee: Ag Leader Technology, Ames, IA (US)

( * ) Notice: Subject to any disclaimer, the term of this patent is extended or adjusted under 35 U.S.C. 154(b) by 661 days.

(21) Appl. No.: 18/081,432

(22) Filed: Dec. 14, 2022

(65) Prior Publication Data

US 2023/0180653 A1 Jun. 15, 2023

Related U.S. Application Data

(60) Provisional application No. 63/289,456, filed on Dec. 14, 2021.

(51) Int. Cl.
*A01C 7/20* (2006.01)
(52) U.S. Cl.
CPC ............... *A01C 7/206* (2013.01); *A01C 7/20* (2013.01)
(58) Field of Classification Search
CPC ............................... A01C 7/206; A01C 5/068
See application file for complete search history.

(56) References Cited

U.S. PATENT DOCUMENTS

| | | |
|---|---|---|
| 9,439 A | 12/1852 | Colver |
| 54,633 A | 5/1866 | Wilkinson |
| 140,493 A | 7/1873 | Fulghum |
| 540,458 A | 6/1895 | Robbins |
| 605,348 A | 6/1898 | Schultz |
| 658,348 A | 9/1900 | Crowley |
| 717,048 A | 12/1902 | Stirling |
| 1,178,765 A | 4/1916 | Waterman |
| 1,220,684 A | 3/1917 | Ray |
| 1,252,923 A | 1/1918 | Moench |
| 1,264,454 A | 4/1918 | Terrell |
| 1,376,933 A | 5/1921 | Gould, Jr. |
| 1,397,689 A | 11/1921 | Krotz |
| 1,566,187 A | 12/1925 | Fifer |
| 1,678,643 A | 7/1928 | Kassebeer |
| 1,731,356 A | 10/1929 | Smith |

(Continued)

FOREIGN PATENT DOCUMENTS

| | | |
|---|---|---|
| AU | 2006203367 A1 | 2/2007 |
| AU | 2010201330 A1 | 3/2011 |

(Continued)

OTHER PUBLICATIONS

360 Yield Sensor—Wave—Date Unknown, available as early as 2020.

(Continued)

*Primary Examiner* — Alicia Torres
(74) *Attorney, Agent, or Firm* — Dentons Davis Brown PC; Matthew Warner-Blankenship; Kassandra Ricklefs

(57) ABSTRACT

A seed delivery shield, comprising a shield body, a retention apparatus configured to attach the shield body to a row unit, and a spring plate shaped to be at least partially engaged with a rear portion of the shield body and extending rearward toward a seed delivery tube. The spring plate configured to protect the row unit and seed tube from damage during and prior to planting operations.

16 Claims, 17 Drawing Sheets

(56) References Cited

U.S. PATENT DOCUMENTS

| | | | |
|---|---|---|---|
| 1,997,791 A | 4/1935 | Hoberg | |
| 2,053,390 A | 9/1936 | Bateman | |
| 2,054,552 A | 9/1936 | Wakeham | |
| 2,141,044 A | 12/1938 | Rassmann | |
| 2,340,163 A | 1/1944 | White | |
| 2,357,760 A | 9/1944 | Peacock | |
| 2,440,846 A | 5/1948 | Cannon | |
| 2,510,658 A | 6/1950 | Rassmann | |
| 2,525,435 A | 10/1950 | White | |
| 2,566,406 A | 9/1951 | Dougherty | |
| 2,589,762 A | 3/1952 | Barnett | |
| 2,673,536 A | 3/1954 | Skinner | |
| 2,913,086 A | 11/1959 | Wade | |
| 2,975,936 A | 3/1961 | Rousek | |
| 2,980,043 A | 4/1961 | Beck | |
| 3,077,290 A | 2/1963 | Rehder | |
| 3,122,283 A | 2/1964 | Walters | |
| 3,176,636 A | 4/1965 | Wilcox et al. | |
| 3,233,523 A | 2/1966 | Passaggio | |
| 3,253,739 A | 5/1966 | Martin | |
| 3,272,159 A | 9/1966 | Sanderson | |
| 3,325,060 A | 6/1967 | Rehder | |
| 3,343,507 A | 9/1967 | Smith | |
| 3,413,941 A | 12/1968 | Roberson | |
| 3,463,010 A | 8/1969 | Hatschek | |
| 3,509,837 A * | 5/1970 | Erickson | A01C 7/20 |
| | | | 222/313 |
| 3,693,833 A | 9/1972 | Weitz | |
| 3,718,191 A | 2/1973 | Williams | |
| 3,749,035 A | 7/1973 | Cayton | |
| 3,796,346 A | 3/1974 | Ribouleau | |
| 3,797,418 A | 3/1974 | Bridger | |
| 3,844,357 A | 10/1974 | Ellinger | |
| 3,913,503 A | 10/1975 | Becker | |
| 3,990,606 A | 11/1976 | Gugenhan | |
| 4,002,266 A | 1/1977 | Beebe | |
| 4,023,509 A | 5/1977 | Hanson | |
| 4,026,437 A | 5/1977 | Biddle | |
| 4,029,235 A | 6/1977 | Grataloup | |
| 4,037,755 A | 7/1977 | Reuter | |
| 4,116,139 A * | 9/1978 | Sauer | A01C 23/025 |
| | | | 111/155 |
| 4,122,974 A | 10/1978 | Harbert | |
| 4,167,910 A | 9/1979 | Pretzer | |
| 4,193,458 A | 3/1980 | Long | |
| 4,193,523 A | 3/1980 | Koning | |
| 4,209,109 A | 6/1980 | Curl | |
| 4,282,985 A | 8/1981 | Yamamoto | |
| 4,288,008 A | 9/1981 | Amblard | |
| 4,324,347 A | 4/1982 | Thomas | |
| 4,329,911 A | 5/1982 | Schwerin | |
| 4,333,561 A | 6/1982 | Schlegel | |
| 4,359,104 A | 11/1982 | Haapala | |
| 4,417,530 A | 11/1983 | Kopecky | |
| 4,449,642 A | 5/1984 | Dooley | |
| 4,596,200 A | 6/1986 | Gafford | |
| 4,600,122 A | 7/1986 | Lundie et al. | |
| 4,613,056 A | 9/1986 | Olson | |
| 4,646,663 A | 3/1987 | Nikkel | |
| 4,653,410 A | 3/1987 | Typpi | |
| 4,655,296 A | 4/1987 | Bourgault | |
| 4,700,785 A | 10/1987 | Bartusek | |
| 4,765,423 A | 8/1988 | Karpa | |
| 4,793,511 A | 12/1988 | Ankum | |
| 4,796,550 A | 1/1989 | Van Natta | |
| 4,865,132 A | 9/1989 | Moore | |
| 4,878,443 A | 11/1989 | Gardner | |
| 4,899,672 A | 2/1990 | Paul | |
| 4,913,070 A | 4/1990 | Morrison | |
| 4,949,656 A * | 8/1990 | Lyle | A01C 7/004 |
| | | | 111/900 |
| 4,949,869 A | 8/1990 | Ribouleau | |
| 4,986,782 A | 1/1991 | Severtson | |
| 5,058,766 A | 10/1991 | Deckler | |
| 5,065,681 A | 11/1991 | Hadley | |
| 5,069,779 A | 12/1991 | Brown | |
| 5,074,227 A | 12/1991 | Schwitters | |
| 5,103,924 A | 4/1992 | Walker | |
| 5,161,472 A | 11/1992 | Handy | |
| 5,163,518 A | 11/1992 | Foley | |
| 5,170,909 A | 12/1992 | Lundie | |
| 5,234,060 A | 8/1993 | Carter | |
| 5,277,257 A | 1/1994 | Thompson | |
| 5,333,559 A | 8/1994 | Hodapp | |
| 5,366,024 A | 11/1994 | Payne | |
| 5,425,318 A * | 6/1995 | Keeton | A01C 5/066 |
| | | | 111/197 |
| 5,427,182 A | 6/1995 | Winter | |
| 5,479,992 A | 1/1996 | Bassett | |
| 5,497,837 A | 3/1996 | Kehrney | |
| 5,499,683 A | 3/1996 | Bassett | |
| 5,501,366 A | 3/1996 | Fiorido | |
| 5,529,128 A | 6/1996 | Peterson | |
| 5,601,209 A | 2/1997 | Barsi | |
| 5,664,507 A | 9/1997 | Bergland | |
| 5,697,308 A | 12/1997 | Rowlett | |
| 5,709,271 A | 1/1998 | Bassett | |
| 5,720,233 A | 2/1998 | Lodico | |
| 5,740,747 A | 4/1998 | Stufflebeam | |
| 5,765,720 A | 6/1998 | Stufflebeam | |
| 5,799,598 A | 9/1998 | Stufflebeam | |
| 5,829,535 A | 11/1998 | Line | |
| 5,842,428 A | 12/1998 | Stufflebeam et al. | |
| 5,848,571 A | 12/1998 | Stufflebeam | |
| 5,862,764 A | 1/1999 | Umemoto | |
| 5,915,313 A | 6/1999 | Bender | |
| 5,936,234 A | 8/1999 | Thomas | |
| 5,961,573 A | 10/1999 | Hale | |
| 5,975,283 A | 11/1999 | Riffe | |
| 6,003,455 A | 12/1999 | Flamme | |
| 6,013,020 A | 1/2000 | Meloul | |
| 6,068,063 A | 5/2000 | Mayerle | |
| 6,068,064 A | 5/2000 | Bettin | |
| 6,091,997 A | 7/2000 | Flamme | |
| 6,116,172 A * | 9/2000 | Prairie | A01C 7/105 |
| | | | 111/924 |
| 6,119,608 A * | 9/2000 | Peterson | A01C 5/066 |
| | | | 172/551 |
| 6,142,086 A | 11/2000 | Richard | |
| 6,260,632 B1 | 7/2001 | Bourgault et al. | |
| 6,269,758 B1 | 8/2001 | Sauder | |
| 6,293,438 B1 | 9/2001 | Woodruff | |
| 6,325,156 B1 | 12/2001 | Barry | |
| 6,352,042 B1 | 3/2002 | Martin | |
| 6,378,619 B2 | 4/2002 | Mayerle | |
| 6,389,999 B1 | 5/2002 | Duello | |
| 6,460,623 B1 | 10/2002 | Knussman | |
| 6,516,733 B1 | 2/2003 | Sauder | |
| 6,640,731 B1 | 11/2003 | Rowlett | |
| 6,651,570 B1 | 11/2003 | Thiemke | |
| 6,681,706 B2 | 1/2004 | Sauder et al. | |
| 6,701,857 B1 | 3/2004 | Jensen | |
| 6,718,892 B1 | 4/2004 | Rosenboom | |
| 6,748,885 B2 | 6/2004 | Sauder et al. | |
| 6,752,095 B1 | 6/2004 | Rylander et al. | |
| 6,827,029 B1 | 12/2004 | Wendte | |
| 6,863,006 B2 | 3/2005 | Sandoval | |
| 7,004,090 B2 | 2/2006 | Swanson | |
| 7,131,384 B2 * | 11/2006 | Kester | A01C 7/206 |
| | | | 111/200 |
| 7,263,937 B2 | 9/2007 | Frasier | |
| 7,334,532 B2 | 2/2008 | Sauder et al. | |
| 7,395,767 B2 | 7/2008 | Sulman | |
| 7,395,769 B2 | 7/2008 | Jensen | |
| 7,404,366 B2 | 7/2008 | Mariman | |
| 7,448,334 B2 | 11/2008 | Mariman | |
| 7,478,603 B2 | 1/2009 | Riewerts | |
| 7,490,565 B2 | 2/2009 | Holly | |
| 7,493,836 B2 | 2/2009 | Wolfer | |
| 7,540,246 B2 | 6/2009 | Friesen | |
| 7,581,684 B2 | 9/2009 | des Garennes et al. | |
| 7,584,707 B2 * | 9/2009 | Sauder | A01C 7/206 |
| | | | 111/140 |
| 7,661,377 B2 | 2/2010 | Keaton | |

(56) References Cited

U.S. PATENT DOCUMENTS

| | | | |
|---|---|---|---|
| 7,673,570 B1 | 3/2010 | Bassett | |
| 7,694,638 B1 | 4/2010 | Riewerts | |
| 7,699,009 B2 | 4/2010 | Sauder et al. | |
| 7,717,048 B2 | 5/2010 | Peterson, Jr. et al. | |
| 7,854,206 B2 | 12/2010 | Horsch | |
| 7,870,826 B2 | 1/2011 | Bourgault | |
| 7,918,168 B2 | 4/2011 | Garner | |
| 7,938,074 B2 | 5/2011 | Liu | |
| 7,980,186 B2 | 7/2011 | Henry | |
| 8,020,657 B2 | 9/2011 | Allard | |
| 8,056,465 B2 | 11/2011 | Carlz | |
| 8,074,586 B2 | 12/2011 | Garner | |
| 8,078,367 B2 | 12/2011 | Sauder | |
| 8,201,507 B2 * | 6/2012 | Sauder | A01C 7/06 |
| | | | 111/163 |
| 8,275,525 B2 | 9/2012 | Kowalchuk | |
| 8,275,627 B2 | 9/2012 | Henning | |
| 8,276,529 B2 | 10/2012 | Garner | |
| 8,286,566 B2 | 10/2012 | Schilling | |
| 8,322,293 B2 | 12/2012 | Wollenhaupt et al. | |
| 8,336,471 B2 | 12/2012 | Gilstring | |
| 8,342,258 B2 | 1/2013 | Ryder | |
| 8,346,442 B2 | 1/2013 | Ryder | |
| 8,371,239 B2 | 2/2013 | Rans et al. | |
| 8,375,873 B2 | 2/2013 | Nelson et al. | |
| 8,375,874 B2 | 2/2013 | Peterson | |
| 8,418,636 B2 | 4/2013 | Liu et al. | |
| 8,430,179 B2 | 4/2013 | Van Buskirk | |
| 8,443,742 B2 | 5/2013 | Orrenius | |
| 8,448,585 B2 | 5/2013 | Wilhelmi et al. | |
| 8,448,587 B2 | 5/2013 | Kowalchuk | |
| 8,448,717 B2 | 5/2013 | Adams et al. | |
| 8,451,449 B2 | 5/2013 | Holland | |
| 8,468,960 B2 | 6/2013 | Garner | |
| 8,479,671 B2 | 7/2013 | Shoup | |
| 8,522,699 B2 | 9/2013 | Garner | |
| 8,522,889 B2 | 9/2013 | Adams et al. | |
| 8,544,397 B2 | 10/2013 | Bassett | |
| 8,544,398 B2 | 10/2013 | Bassett | |
| 8,550,020 B2 | 10/2013 | Sauder et al. | |
| 8,561,472 B2 | 10/2013 | Sauder et al. | |
| 8,573,111 B2 | 11/2013 | Graham | |
| 8,634,992 B2 | 1/2014 | Sauder et al. | |
| 8,636,077 B2 | 1/2014 | Bassett | |
| 8,671,856 B2 | 3/2014 | Garner et al. | |
| 8,677,914 B2 | 3/2014 | Stark | |
| 8,746,159 B2 | 6/2014 | Garner et al. | |
| 8,755,049 B2 | 6/2014 | Holland | |
| 8,763,713 B2 | 7/2014 | Bassett | |
| 8,770,308 B2 | 7/2014 | Bassett | |
| 8,776,702 B2 | 7/2014 | Bassett | |
| 8,789,482 B2 | 7/2014 | Garner | |
| 8,789,483 B2 | 7/2014 | Gilstring | |
| RE45,091 E | 8/2014 | Bassett | |
| 8,800,457 B2 | 8/2014 | Garner | |
| 8,813,663 B2 | 8/2014 | Garner | |
| 8,814,474 B2 | 8/2014 | Bell | |
| 8,850,995 B2 | 10/2014 | Garner | |
| 8,850,998 B2 | 10/2014 | Garner | |
| 8,863,857 B2 | 10/2014 | Bassett | |
| 8,903,545 B2 | 12/2014 | Riffel | |
| 8,909,436 B2 | 12/2014 | Achen | |
| 8,910,582 B2 | 12/2014 | Mariman et al. | |
| 8,924,092 B2 | 12/2014 | Achen | |
| 8,924,102 B2 | 12/2014 | Sauder et al. | |
| 8,942,896 B2 | 1/2015 | Mayerle | |
| RE45,412 E | 3/2015 | Sauder et al. | |
| 8,978,564 B2 | 3/2015 | Hagny | |
| 8,985,037 B2 | 3/2015 | Radtke | |
| 8,985,232 B2 | 3/2015 | Bassett | |
| 9,055,712 B2 | 6/2015 | Bassett | |
| 9,107,337 B2 | 8/2015 | Bassett | |
| 9,107,338 B2 | 8/2015 | Bassett | |
| 9,113,589 B2 | 8/2015 | Bassett | |
| 9,119,342 B2 | 9/2015 | Bonefas | |
| 9,137,938 B2 | 9/2015 | Zimmerman | |
| 9,137,941 B2 | 9/2015 | Stark | |
| 9,144,187 B2 | 9/2015 | Bassett | |
| 9,144,189 B2 | 9/2015 | Stoller | |
| 9,148,992 B2 | 10/2015 | Staeter | |
| 9,151,388 B2 | 10/2015 | Gilstring | |
| 9,167,740 B2 | 10/2015 | Bassett | |
| 9,173,339 B2 | 11/2015 | Sauder et al. | |
| 9,192,089 B2 | 11/2015 | Bassett | |
| 9,213,905 B2 | 12/2015 | Lange | |
| 9,226,440 B2 | 1/2016 | Bassett | |
| 9,232,687 B2 | 1/2016 | Bassett | |
| 9,265,191 B2 | 2/2016 | Sauder et al. | |
| 9,277,688 B2 | 3/2016 | Wilhelmi | |
| 9,282,691 B2 | 3/2016 | Wilhelmi | |
| 9,282,692 B2 | 3/2016 | Wilhelmi | |
| 9,288,937 B2 | 3/2016 | Sauder et al. | |
| 9,301,438 B2 | 4/2016 | Sauder et al. | |
| 9,313,941 B2 | 4/2016 | Garner | |
| 9,313,942 B2 | 4/2016 | Wilhelmi | |
| 9,332,689 B2 | 5/2016 | Baurer | |
| 9,338,937 B2 | 5/2016 | Sauder et al. | |
| 9,345,188 B2 | 5/2016 | Garner | |
| 9,351,440 B2 | 5/2016 | Sauder et al. | |
| 9,426,940 B2 | 8/2016 | Connors et al. | |
| 9,433,141 B2 | 9/2016 | Friestad | |
| 9,462,744 B2 | 10/2016 | Isaacson | |
| 9,480,199 B2 | 11/2016 | Garner | |
| 9,485,900 B2 | 11/2016 | Connell | |
| 9,491,901 B2 | 11/2016 | Gentili | |
| 9,510,498 B2 | 12/2016 | Tuttle et al. | |
| 9,510,502 B2 | 12/2016 | Garner et al. | |
| 9,523,496 B2 | 12/2016 | Bingham | |
| 9,532,496 B2 | 1/2017 | Sauder et al. | |
| 9,544,395 B2 | 1/2017 | Godfrey et al. | |
| 9,554,504 B2 | 1/2017 | Houck | |
| 9,578,802 B2 | 2/2017 | Radtke | |
| 9,585,301 B1 | 3/2017 | Lund | |
| 9,603,298 B2 | 3/2017 | Wendte et al. | |
| 9,622,402 B2 | 4/2017 | Kinzenbaw et al. | |
| 9,629,301 B2 | 4/2017 | Gentili | |
| 9,629,302 B2 | 4/2017 | Gentili | |
| 9,629,304 B2 | 4/2017 | Zielke | |
| 9,661,799 B2 | 5/2017 | Garner | |
| 9,668,402 B2 * | 6/2017 | Hagny | A01C 5/064 |
| 9,675,002 B2 | 6/2017 | Roszman | |
| 9,675,004 B2 | 6/2017 | Landphair et al. | |
| 9,681,601 B2 | 6/2017 | Bassett | |
| 9,686,906 B2 | 6/2017 | Garner et al. | |
| 9,693,496 B2 | 7/2017 | Tevs | |
| 9,693,498 B2 | 7/2017 | Zumdome | |
| 9,699,955 B2 | 7/2017 | Garner | |
| 9,699,958 B2 | 7/2017 | Koch | |
| 9,706,702 B2 | 7/2017 | Wendte et al. | |
| 9,723,778 B2 | 8/2017 | Bassett | |
| 9,730,379 B2 | 8/2017 | Wendte | |
| 9,733,634 B2 | 8/2017 | Prickel | |
| 9,746,007 B1 | 8/2017 | Stoller | |
| 9,750,174 B2 | 9/2017 | Sauder et al. | |
| 9,752,596 B2 | 9/2017 | Sauder | |
| 9,756,779 B2 | 9/2017 | Wilhelmi et al. | |
| 9,769,978 B2 | 9/2017 | Radtke | |
| 9,788,472 B2 | 10/2017 | Bassett | |
| 9,801,332 B2 | 10/2017 | Landphair | |
| 9,807,921 B2 | 11/2017 | Levy et al. | |
| 9,807,922 B2 | 11/2017 | Garner | |
| 9,807,924 B2 | 11/2017 | Garner et al. | |
| 9,814,172 B2 | 11/2017 | Achen et al. | |
| 9,814,176 B2 | 11/2017 | Kowalchuk | |
| 9,820,427 B2 | 11/2017 | Hagny | |
| 9,820,429 B2 | 11/2017 | Garner | |
| 9,832,924 B2 | 12/2017 | Anderson | |
| 9,848,522 B2 | 12/2017 | Bassett | |
| 9,848,523 B2 | 12/2017 | Sauder | |
| 9,854,733 B1 | 1/2018 | Kile | |
| 9,861,025 B2 | 1/2018 | Schaefer et al. | |
| 9,861,031 B2 | 1/2018 | Garner | |
| 9,872,424 B2 | 1/2018 | Baurer et al. | |
| 9,879,702 B2 | 1/2018 | Stoller | |

(56)                    References Cited

U.S. PATENT DOCUMENTS

| | | | |
|---|---|---|---|
| 9,936,627 B2 | 4/2018 | Wilhelmi et al. | |
| 9,936,628 B2 | 4/2018 | Wilhelmi et al. | |
| 9,949,426 B2 | 4/2018 | Radtke | |
| 9,955,623 B2 | 5/2018 | Sauder et al. | |
| 9,968,033 B2 | 5/2018 | Dunn | |
| 9,980,426 B2 | 5/2018 | Wilhelmi et al. | |
| 10,004,173 B2 | 6/2018 | Garner | |
| 10,010,024 B2 | 7/2018 | Pirkenseer et al. | |
| 10,045,477 B2 * | 8/2018 | Hagny | A01C 5/068 |
| 10,051,782 B2 | 8/2018 | Wilhelmi et al. | |
| 10,064,322 B2 | 9/2018 | Luc | |
| 10,091,926 B2 | 10/2018 | Maro | |
| 10,104,830 B2 | 10/2018 | Heathcote | |
| 10,104,832 B2 | 10/2018 | Wilhelmi et al. | |
| 10,111,415 B2 | 10/2018 | Kolb | |
| 10,143,128 B2 | 12/2018 | Landphair et al. | |
| 10,154,623 B2 | 12/2018 | Wilhelmi et al. | |
| 10,206,326 B2 | 2/2019 | Garner | |
| 10,231,376 B1 | 3/2019 | Stanhope | |
| 10,257,973 B2 * | 4/2019 | Hubner | A01C 5/062 |
| 10,299,425 B2 | 5/2019 | Sauder et al. | |
| 10,398,077 B2 | 9/2019 | Radtke | |
| 10,408,670 B2 | 9/2019 | Holcomb | |
| 10,470,358 B2 | 11/2019 | Sauder et al. | |
| 10,485,159 B2 | 11/2019 | Wilhelmi et al. | |
| 10,548,259 B2 | 2/2020 | Heathcote | |
| 10,609,857 B2 | 4/2020 | Sauder | |
| 10,645,865 B2 | 5/2020 | Bassett | |
| 10,729,063 B2 | 8/2020 | Garner | |
| 10,743,460 B2 | 8/2020 | Gilbert | |
| 10,806,070 B2 | 10/2020 | Garner et al. | |
| 10,821,829 B2 | 11/2020 | Foster | |
| 10,959,369 B2 | 3/2021 | Sieling | |
| RE48,572 E | 6/2021 | Garner | |
| 11,051,445 B2 | 7/2021 | Hubner | |
| 11,058,048 B2 | 7/2021 | Radtke | |
| 11,144,775 B2 | 10/2021 | Ferrari | |
| 11,197,411 B2 | 12/2021 | Bassett | |
| 11,202,404 B2 | 12/2021 | Walter | |
| 11,212,954 B2 | 1/2022 | Maeder | |
| 11,277,961 B2 | 3/2022 | Campbell | |
| 11,523,554 B2 | 12/2022 | Buehler | |
| 11,612,096 B2 | 3/2023 | Sivinski | |
| 11,622,494 B2 | 4/2023 | Arnett et al. | |
| 11,672,195 B2 * | 6/2023 | Stoller | A01C 23/025 |
| | | | 111/120 |
| 11,730,079 B2 | 8/2023 | Wilhelmi | |
| 11,785,881 B2 | 10/2023 | Buehler | |
| 11,818,977 B2 | 11/2023 | Anderson | |
| 11,877,530 B2 | 1/2024 | Barry | |
| 11,997,939 B2 | 6/2024 | Gilbert | |
| 12,075,719 B2 * | 9/2024 | Strnad | A01C 5/062 |
| 12,158,388 B2 | 12/2024 | Yelle | |
| 12,369,518 B2 * | 7/2025 | Zumdome | A01C 7/20 |
| 2002/0056407 A1 | 5/2002 | Milne | |
| 2002/0073678 A1 | 6/2002 | Lucand | |
| 2003/0005867 A1 | 1/2003 | Richard | |
| 2003/0183141 A1 | 10/2003 | Bergere et al. | |
| 2004/0139895 A1 | 7/2004 | Thompson et al. | |
| 2005/0103244 A1 | 5/2005 | Mayerle | |
| 2005/0155536 A1 | 7/2005 | Wendte | |
| 2005/0172873 A1 | 8/2005 | Mayerle | |
| 2005/0263049 A1 | 12/2005 | Summach | |
| 2006/0086295 A1 | 4/2006 | Jensen | |
| 2008/0110382 A1 | 5/2008 | Brockmeier | |
| 2008/0229986 A1 | 9/2008 | Arksey | |
| 2008/0257237 A1 | 10/2008 | Friesen | |
| 2009/0056531 A1 | 3/2009 | Jessen | |
| 2009/0056537 A1 | 3/2009 | Jessen | |
| 2009/0112410 A1 | 4/2009 | Shull | |
| 2010/0180808 A1 | 7/2010 | Liu | |
| 2010/0192818 A1 | 8/2010 | Garner | |
| 2010/0224110 A1 | 9/2010 | Mariman | |
| 2010/0270043 A1 | 10/2010 | Ankenman | |
| 2010/0319941 A1 | 12/2010 | Peterson | |
| 2011/0027479 A1 | 2/2011 | Reineccius | |
| 2011/0028214 A1 | 2/2011 | Bright et al. | |
| 2011/0162566 A1 | 7/2011 | Willhelmi et al. | |
| 2011/0271887 A1 | 11/2011 | Shoup | |
| 2011/0313575 A1 | 12/2011 | Kowalchuk | |
| 2012/0042813 A1 | 2/2012 | Liu et al. | |
| 2012/0046838 A1 | 2/2012 | Landphair et al. | |
| 2012/0048159 A1 | 3/2012 | Adams et al. | |
| 2012/0048160 A1 | 3/2012 | Adams | |
| 2012/0151910 A1 | 6/2012 | Sauder | |
| 2012/0186503 A1 | 7/2012 | Sauder | |
| 2012/0261149 A1 | 10/2012 | Schmidt | |
| 2012/0291680 A1 | 11/2012 | Rylander | |
| 2013/0032363 A1 | 2/2013 | Curry et al. | |
| 2013/0126430 A1 | 5/2013 | Kenley | |
| 2013/0248212 A1 | 9/2013 | Bassett | |
| 2013/0333601 A1 | 12/2013 | Shivak | |
| 2014/0026748 A1 | 1/2014 | Stoller | |
| 2014/0033972 A1 | 2/2014 | Meyer | |
| 2014/0060869 A1 | 3/2014 | Blunier | |
| 2014/0109808 A1 | 4/2014 | Schilling | |
| 2014/0116735 A1 | 5/2014 | Bassett | |
| 2014/0190712 A1 | 7/2014 | Bassett | |
| 2014/0214284 A1 | 7/2014 | Sauder et al. | |
| 2014/0216771 A1 | 8/2014 | Bassett | |
| 2014/0230705 A1 | 8/2014 | Radtke | |
| 2014/0238284 A1 | 8/2014 | Kapphahn | |
| 2014/0262378 A1 | 9/2014 | Connors | |
| 2014/0277959 A1 | 9/2014 | Wagers | |
| 2014/0303854 A1 | 10/2014 | Zielke | |
| 2014/0379230 A1 | 12/2014 | Koch | |
| 2015/0094916 A1 | 4/2015 | Bauerer et al. | |
| 2015/0107501 A1 | 4/2015 | Barton | |
| 2015/0176614 A1 | 6/2015 | Stoller | |
| 2015/0195988 A1 | 7/2015 | Radtke | |
| 2015/0201549 A1 | 7/2015 | Baurer | |
| 2015/0223391 A1 | 8/2015 | Wendte | |
| 2015/0223392 A1 | 8/2015 | Wilhelmi et al. | |
| 2015/0264857 A1 | 9/2015 | Achen | |
| 2015/0271986 A1 | 10/2015 | Sauder | |
| 2015/0289441 A1 | 10/2015 | Arnett | |
| 2015/0289442 A1 | 10/2015 | Heilman | |
| 2015/0305229 A1 | 10/2015 | Sauder | |
| 2015/0319919 A1 | 11/2015 | Sauder | |
| 2015/0351315 A1 | 12/2015 | Wendte | |
| 2016/0007521 A1 | 1/2016 | Kusler | |
| 2016/0007524 A1 | 1/2016 | Kusler | |
| 2016/0040692 A1 | 2/2016 | Stoller | |
| 2016/0128269 A1 | 5/2016 | Helmick | |
| 2016/0128272 A1 | 5/2016 | Sauder | |
| 2016/0143213 A1 | 5/2016 | Kowalchuk | |
| 2016/0157412 A1 | 6/2016 | Sauder | |
| 2016/0212932 A1 | 7/2016 | Radtke | |
| 2016/0227700 A1 | 8/2016 | Wendte | |
| 2016/0227701 A1 | 8/2016 | Nelson | |
| 2016/0249525 A1 | 9/2016 | Baurer et al. | |
| 2017/0000016 A1 | 1/2017 | Prickel | |
| 2017/0013771 A1 | 1/2017 | Townsend | |
| 2017/0020058 A1 | 1/2017 | Pirkenseer et al. | |
| 2017/0034995 A1 | 2/2017 | Wilhelmi | |
| 2017/0049044 A1 | 2/2017 | Stoller | |
| 2017/0086347 A1 | 3/2017 | Sauder | |
| 2017/0094889 A1 | 4/2017 | Garner | |
| 2017/0094894 A1 | 4/2017 | Heim | |
| 2017/0112043 A1 | 4/2017 | Nair | |
| 2017/0127604 A1 | 5/2017 | Wilhelmi | |
| 2017/0223947 A1 | 8/2017 | Gall | |
| 2017/0280616 A1 | 10/2017 | Gervais | |
| 2017/0332546 A1 | 11/2017 | Garner et al. | |
| 2017/0354079 A1 | 12/2017 | Foster | |
| 2017/0357029 A1 | 12/2017 | Lakshmanan | |
| 2017/0359941 A1 | 12/2017 | Czapka | |
| 2017/0359949 A1 | 12/2017 | Garner et al. | |
| 2017/0367252 A1 | 12/2017 | Sakaguchi | |
| 2017/0367255 A1 | 12/2017 | Wilhelmi et al. | |
| 2018/0007824 A1 | 1/2018 | Radtke | |
| 2018/0015490 A1 | 1/2018 | Grimm | |
| 2018/0024549 A1 | 1/2018 | Hurd | |
| 2018/0092287 A1 | 4/2018 | Garner | |

(56) References Cited

U.S. PATENT DOCUMENTS

| | | | |
|---|---|---|---|
| 2018/0092288 A1 | 4/2018 | Garner |
| 2018/0092289 A1 | 4/2018 | Wonderlich |
| 2018/0092295 A1 | 4/2018 | Sugumaran |
| 2018/0125000 A1 | 5/2018 | Levy |
| 2018/0128933 A1 | 5/2018 | Koch |
| 2018/0132422 A1 | 5/2018 | Hassanzadeh et al. |
| 2018/0132423 A1 | 5/2018 | Rowan |
| 2018/0168094 A1 | 6/2018 | Koch |
| 2018/0199499 A1 | 7/2018 | Adams |
| 2018/0199505 A1 | 7/2018 | Beaujot |
| 2018/0206393 A1 | 7/2018 | Stoller |
| 2018/0210443 A1 | 7/2018 | Matsuzaki |
| 2018/0249624 A1 | 9/2018 | Gentili |
| 2018/0263174 A1 | 9/2018 | Hodel |
| 2018/0292339 A1 | 10/2018 | Gunzenhauser |
| 2018/0317380 A1 | 11/2018 | Bassett |
| 2018/0317381 A1 | 11/2018 | Bassett |
| 2018/0368310 A1 | 12/2018 | Zimmerman |
| 2018/0373264 A1 | 12/2018 | Madsen |
| 2019/0021211 A1 | 1/2019 | Gutknecht |
| 2019/0029165 A1 | 1/2019 | Leimkuehler et al. |
| 2019/0045703 A1 | 2/2019 | Bassett |
| 2019/0059206 A1 | 2/2019 | Stanhope |
| 2019/0072114 A1 | 3/2019 | Myers et al. |
| 2019/0075714 A1 | 3/2019 | Koch |
| 2019/0098828 A1 | 4/2019 | Wilhelmi |
| 2019/0124824 A1 | 5/2019 | Hubner |
| 2019/0162164 A1 | 5/2019 | Funk |
| 2019/0174666 A1 | 6/2019 | Mantemach |
| 2019/0191622 A1 | 6/2019 | Hafvenstein |
| 2019/0232304 A1 | 8/2019 | Grimm |
| 2019/0239413 A1 | 8/2019 | DeGarmo |
| 2019/0254223 A1 | 8/2019 | Eichhorn |
| 2019/0286915 A1 | 9/2019 | Patil |
| 2019/0289778 A1 | 9/2019 | Koch |
| 2019/0297769 A1 | 10/2019 | Zielke et al. |
| 2019/0297774 A1 | 10/2019 | Hamilton |
| 2019/0302799 A1 | 10/2019 | Schaff |
| 2019/0373801 A1 | 12/2019 | Schoeny |
| 2019/0380259 A1 | 12/2019 | Frank |
| 2019/0387662 A1 * | 12/2019 | Viriat ..................... A01C 5/064 |
| 2020/0029486 A1 | 1/2020 | Buehler et al. |
| 2020/0045869 A1 | 2/2020 | Stanhope |
| 2020/0053954 A1 * | 2/2020 | Hamilton ............... A01C 5/064 |
| 2020/0068778 A1 | 3/2020 | Schoeny |
| 2020/0068783 A1 | 3/2020 | Strnad |
| 2020/0084951 A1 | 3/2020 | Fanshier |
| 2020/0100418 A1 | 4/2020 | Komecki |
| 2020/0100419 A1 | 4/2020 | Stanhope |
| 2020/0100421 A1 | 4/2020 | Wang |
| 2020/0100423 A1 | 4/2020 | Dienst |
| 2020/0109954 A1 | 4/2020 | Li |
| 2020/0128723 A1 | 4/2020 | Eichhorn |
| 2020/0154627 A1 | 5/2020 | Plattner |
| 2020/0154629 A1 | 5/2020 | Holoubek et al. |
| 2020/0178455 A1 | 6/2020 | Ishikawa |
| 2020/0217044 A1 | 7/2020 | Martel |
| 2020/0221630 A1 | 7/2020 | Pomedli |
| 2020/0296882 A1 | 9/2020 | Madison |
| 2020/0305335 A1 | 10/2020 | Schoeny |
| 2020/0329631 A1 | 10/2020 | Johnson |
| 2020/0337218 A1 | 10/2020 | Puhalla |
| 2020/0352088 A1 | 11/2020 | Arnett |
| 2020/0359559 A1 | 11/2020 | Koch |
| 2020/0375081 A1 | 12/2020 | Holoubek |
| 2020/0375085 A1 | 12/2020 | Strnad |
| 2020/0375090 A1 | 12/2020 | Morgan |
| 2021/0022286 A1 | 1/2021 | Gilbert et al. |
| 2021/0037699 A1 | 2/2021 | Wilhelmi |
| 2021/0051846 A1 | 2/2021 | Vandenbark |
| 2021/0059102 A1 | 3/2021 | Geistkemper |
| 2021/0120726 A1 | 4/2021 | Barrick |
| 2021/0132618 A1 | 5/2021 | Van Roekel |
| 2021/0153421 A1 | 5/2021 | Holoubek et al. |
| 2021/0161060 A1 | 6/2021 | Kaufmann |

| | | | |
|---|---|---|---|
| 2021/0185903 A1 | 6/2021 | Demiter |
| 2021/0212252 A1 | 7/2021 | Wilhelmi |
| 2021/0235611 A1 | 8/2021 | Fett |
| 2021/0243939 A1 | 8/2021 | Strnad |
| 2021/0243941 A1 | 8/2021 | Buehler |
| 2021/0289707 A1 | 9/2021 | Schloesser |
| 2021/0307236 A1 | 10/2021 | Strnad et al. |
| 2021/0315147 A1 | 10/2021 | Fanshier |
| 2021/0329838 A1 | 10/2021 | Zielke |
| 2022/0000008 A1 | 1/2022 | Hubner et al. |
| 2022/0061202 A1 | 3/2022 | Holoubek et al. |
| 2022/0061208 A1 | 3/2022 | Campbell |
| 2022/0142039 A1 | 5/2022 | Eichhorn et al. |
| 2022/0142041 A1 | 5/2022 | Johnson |
| 2022/0151138 A1 | 5/2022 | Barry |
| 2022/0174855 A1 | 6/2022 | Zielke et al. |
| 2022/0192080 A1 | 6/2022 | Goza |
| 2022/0232753 A1 | 7/2022 | Van De Woestyne et al. |
| 2022/0272888 A1 | 9/2022 | Hodel |
| 2022/0369534 A1 | 11/2022 | Nikolakakis |
| 2023/0105245 A1 | 4/2023 | Buehler |
| 2023/0145955 A1 | 5/2023 | Schmidt et al. |
| 2023/0180653 A1 | 6/2023 | Barry |
| 2023/0232732 A1 | 7/2023 | Hartogh |
| 2023/0232733 A1 | 7/2023 | Barry |
| 2023/0270039 A1 | 8/2023 | Fanshier |
| 2023/0388458 A1 | 11/2023 | Eichhorn et al. |
| 2023/0413720 A1 | 12/2023 | Barry |
| 2024/0032455 A1 | 2/2024 | Buehler |
| 2024/0040955 A1 | 2/2024 | Barry |
| 2024/0167848 A1 | 5/2024 | Johnson |
| 2024/0180066 A1 | 6/2024 | Holoubek |
| 2024/0315163 A1 | 9/2024 | Gilbert |
| 2024/0334864 A1 | 10/2024 | Holoubek et al. |
| 2025/0133977 A1 | 5/2025 | Barry et al. |
| 2025/0348988 A1 | 11/2025 | Eichhorn |
| 2026/0007091 A1 * | 1/2026 | Godart ................. A01C 7/0445 |
| 2026/0056032 A1 | 2/2026 | Roe |

FOREIGN PATENT DOCUMENTS

| | | | |
|---|---|---|---|
| AU | 2017382800 B2 | 6/2018 |
| AU | 2018100865 B4 * | 6/2022 |
| BR | 102015003633 B1 | 12/2015 |
| BR | 102016002919 B1 | 8/2016 |
| CA | 1218266 A | 2/1987 |
| CA | 2346724 A1 | 4/2000 |
| CA | 2408684 A1 | 12/2001 |
| CA | 2213350 C | 7/2002 |
| CA | 2213354 C | 7/2002 |
| CA | 2213703 C | 7/2002 |
| CA | 2549371 A1 | 11/2007 |
| CA | 2584736 A1 | 9/2008 |
| CA | 2727188 A1 | 12/2009 |
| CA | 2830627 C | 9/2012 |
| CA | 2915844 C | 12/2015 |
| CA | 2923713 A1 | 12/2016 |
| CN | 201057704 Y | 5/2008 |
| CN | 206380282 U | 8/2017 |
| CN | 108362267 A | 8/2018 |
| CN | 109463081 A | 3/2019 |
| CN | 110667889 A | 1/2020 |
| CN | 112601450 A | 4/2021 |
| DE | 389840 C | 2/1924 |
| DE | 2011462 A1 | 9/1971 |
| DE | 2826658 A1 | 4/1981 |
| DE | 8400142 U1 | 5/1984 |
| DE | 3405031 C1 | 4/1985 |
| DE | 3826397 A1 | 1/1989 |
| DE | 202005007450 U1 | 7/2005 |
| DE | 102017118594 A1 | 2/2019 |
| EP | 47577 A3 | 3/1982 |
| EP | 152048 A2 | 8/1985 |
| EP | 182220 B1 | 5/1986 |
| EP | 372901 A2 | 6/1990 |
| EP | 606541 A1 | 1/1997 |
| EP | 1461989 A1 | 9/2004 |
| EP | 2832203 B1 | 2/2015 |
| EP | 2911497 B1 | 10/2016 |

(56)                References Cited

FOREIGN PATENT DOCUMENTS

| EP | 2911499 B1 | 10/2016 | | |
| EP | 3108731 A8 | 12/2016 | | |
| EP | 2688384 B1 | 6/2017 | | |
| EP | 3219186 A1 * | 9/2017 | .............. | A01C 7/20 |
| EP | 2901838 B1 * | 11/2017 | .............. | A01C 7/20 |
| EP | 3698615 A1 | 8/2020 | | |
| EP | 3753388 A2 | 12/2020 | | |
| FR | 1229027 A | 9/1960 | | |
| FR | 1503687 A | 12/1967 | | |
| FR | 2414288 A1 | 8/1979 | | |
| FR | 2490064 A1 | 3/1982 | | |
| FR | 2591061 A1 | 6/1986 | | |
| FR | 2574243 A1 | 6/1987 | | |
| FR | 2678472 A1 | 1/1993 | | |
| GB | 18381 A | 10/1904 | | |
| GB | 482789 A | 4/1938 | | |
| GB | 989145 A | 4/1965 | | |
| GB | 1136771 A | 12/1968 | | |
| GB | 2057835 A | 4/1981 | | |
| GB | 2012534 A | 1/1982 | | |
| GB | 2309622 A | 6/1997 | | |
| JP | S56-24815 U | 3/1981 | | |
| JP | H11-59886 A | 3/1999 | | |
| JP | 2007117941 A | 5/2007 | | |
| JP | 4517467 B2 | 8/2010 | | |
| KR | 20040029905 A | 4/2004 | | |
| KR | 20080044756 A | 5/2008 | | |
| KR | 101728137 B1 | 4/2017 | | |
| NL | 1005451 C2 | 9/1998 | | |
| RU | 2355152 C2 | 5/2009 | | |
| SU | 948316 A1 | 8/1982 | | |
| SU | 1148582 A | 4/1985 | | |
| WO | 9716954 A1 | 5/1997 | | |
| WO | 1998/049884 A1 | 11/1998 | | |
| WO | 2005/011358 A1 | 2/2005 | | |
| WO | 2009134144 A1 | 11/2009 | | |
| WO | 2010/059101 A1 | 5/2010 | | |
| WO | 2010/124360 A1 | 11/2010 | | |
| WO | 2013/130003 A1 | 9/2013 | | |
| WO | 2014153157 A1 | 9/2014 | | |
| WO | 2015171908 A1 | 11/2015 | | |
| WO | 2017160860 A1 | 9/2017 | | |
| WO | 2017197274 A1 | 11/2017 | | |
| WO | 2017197292 A1 | 11/2017 | | |
| WO | 2018151989 A1 | 8/2018 | | |
| WO | 2020012369 A3 | 1/2020 | | |
| WO | WO-2020049467 A1 * | 3/2020 | ............. | A01C 5/068 |
| WO | 2021021594 A1 | 2/2021 | | |
| WO | 2021231159 A1 | 11/2021 | | |

OTHER PUBLICATIONS

8910 Floating Hitch Cultivator, Date Unknown, available as early as 2010—https://www.bourgault.com/en-us/products/tillage/8910-cultivator.
Boss 18 Metre Parallelogram Tyne Planter—https://www.thecombineforum.com/threads/boss-18-metre-parallelogram-tyne-planter-on-9-spacing.222722/, Date Unknown, available as early as 2010.
Contour King Gallery—ZML, Date Unknown, available as early as 2013.
Dawn ACS Explanation video, https://twitter.com/DawnEquipment/status/969698839409111045.
Deere "SeedStar 2 Deere SeedStar XP Monitor for Planters" pp. 70-8-70-9.
Enfield Technologies, EQV Proportional Pinch Valves, https://www.enfieldtech.com/Products/EQV-Proportional-Pinch-Valves.
Farm Equipment—ZML.

Ground Breaker Precision Planters and Patented Tyne and Disc Row Units—https://www.precisionagsolutions.com.au/ground-breaker.
Industrial Electronics Robust control of active suspensions for high performance vehicles, Proceedings of IEEE International Symposium on Industrial Electronics, 1996.
Industrial electronics, modeling and force tracking control of hydraulic actuator for an active suspension system, 2006 1st IEEE Conference on Industrial Electronics and Applications, 2006.
Janke Australia, Date Unknown, available as early as 2017—https://www.janke.com.au/.
John Deere Delta Force Diagram.
Kasper, relationship between six years of corn yields and terrain attributes, ISU—Kaspar, Tom & Colvin, Thomas & Jaynes, D.B. & Karlen, Douglas & James, David & Meek, David & Pulido, Daniel & Butler, Howard. (2003). Relationship Between Six Years of Corn Yields and Terrain Attributes. Precision Agriculture. 4. 87-101.
Gratton et al, Manitoba, Design of a spring-loaded downforce system for a no-till seed opener, 2003.
Zong-yi et al., Minesweeping Tank, Electrohydraulic System Using RBF Neural Network and Genetic Algorithm, 2010.
Modular Row Crop Planting Systems from Excel Agriculture, Date Unknown, available as early as 2002—https://www.excelagr.com.au/excel-agri-row-crop-planter.php.
Orthman ItRIPr row unit, 2019—https://www.orthmanequip.com/strip-tillage/1tripr/.
Parallelogram Tyne Units—https://bossagriculture.com.au/home/planter-row-units/parallelogram-tyne-units/.
Patriot Parallelogram Tyne Planter Farm Equipment Gessner, available as early as 2017—https://www.gessner.com.au/products/patriot-parallelogram-tyne-planter/.
Precision Planting 2010 Full Line Brochure.
Precision Planting Furrowforce—https://precisionplanting.com/products/product/furrowforce.
Precision Planting FurrowJet, Date Unknown—available as early as 2017, https://precisionplanting.com/products/product/furrowjet.
Precision tyne planter takes innovation award, 2017, https://www.graincentral.com/machinery/precision-tyne-planter-takes-innovation-award.
What to Look for in a No Till or Minimum Tillage Planter—https://multifarmingsystems.com.au/wp-content/uploads/2015/07/What-to-Look-for-in-a-No-Till-or-Minimum-Tillage-Planter.pdf.
ZML Contour King, Youtube Video Aug. 13, 2021, https://www.youtube.com/watch?v=T-rj_EZMCM4.
Tempo, Vaderstad, 2017.
Fundamentals of Machine Operation—Planting, Deere & Co. (Breece et al 1975).
John Deere 7000 and 7100 MaxEmerge Planting Unit, parts catalog.
Manual for Deere 495 and 695 planters.
Monosem NG Plus seed meter; 1994 Monosem manual.
Fundamentals of Machine Operation—Planting, Deere & Co. (Breece et al 1981).
John Deere Planter Models 71 Flexi, 495A, 695A.
John Deere Operators Manual 694A, 695A, and 894A Corn Planters (OMB25391 E7).
John Deere 494-A and 495-A Four-row Corn Planters (A1477-62-12-Pltr. (Litho in USA)).
Kinze Promotion Video True Speed—3D with Ultra Slow Motion.
Kinze Promotional Brochure "High Speed Planting Solution True Speed".
Ag leader Promotional Video "Ag Leader SureSpeed".
Ag Leader Promotional Video "Ag Leader SureSpeed Unveiling".
Kinze Promotional video "an in-depth look into kinze's true speed".
Page 130 of version 5.2 Operating Manual for the Ag Leader Integra, Part No. 4002083.
Salte et al. Nov. 12, 1997 CZ203397A3 (Year: 1997).
Oberschmid Jan. 5, 1989 Seed-desposting Synchronising Device for High-speed Agricultural Seed Drills (Year:1989).

* cited by examiner

SEED TUBE GUARD AND ASSOCIATED SYSTEMS AND METHODS OF USE

CROSS-REFERENCE TO RELATED APPLICATION(S)

This application claims the benefit under 35 U.S.C. § 119(e) to U.S. Provisional Application 63/289,456, filed Dec. 14, 2021, and entitled Seed Tube Guard, which is hereby incorporated herein by reference in its entirety for all purposes.

TECHNICAL FIELD

The disclosure relates to row crop planters and more particularly devices for technology relating to the protecting seeding systems and devices.

BACKGROUND

Various configurations of row crop planters and row units are known in the art. These known planters and row units all have some mechanical similarities. As shown in FIGS. 1 and 2, planters 10 consist of a plurality of substantially identical row units 12. The row units 12 typically include a pair of disc opener blades 14 that meet to enter the soil and then diverge to force the soil into the shape of a furrow. Row units 12 may also optionally include gauge wheels 16, closings discs 18, a firmer (not pictured), and/or a row cleaner (not pictured).

Also disposed on various known row units 12 is a seed delivery system 24. The seed delivery system 24 being configured to deposit seeds within the furrow formed by the opening discs 14. In various known implementations, at the rear of the opening discs 14 is a seed delivery tube 26 intended to provide a path for the seed to fall from a seed meter 28 to the furrow. The seed delivery tube 26 is usually made of plastic and is therefore fairly fragile. To keep the seed delivery tube 26 from being knocked out of position or damaged a replaceable component commonly known as a seed tube guard may be included in the assembly.

Known variations of seed tube guards 27 are shown in FIGS. 3 and 4. Various manufacturers use various known designs to protect the seed tube 26 from impact damage. Another known purpose of a seed tube guard 27 is to serve as a point of contact for the furrow opener discs 14 to support the opener discs 14 as soil forces push the discs 14 inward. This force tends to rapidly wear away the seed tube guard 27, such that in heavy use conditions the seed tube guard 27 is a part that may be frequently replaced.

Because the seed tube guard 27 is frequently replaced many manufacturers have devised ways to retain the seed tube guard 27 while requiring few or no tools to remove and replace seed tube guard 27. For example, some manufacturers hang the seed tube guard 27 from pins, while others use a twist and lock method, as would be appreciated.

Planters with high-speed seed delivery systems 24, such as paddle belts 30 that deliver seed to the seed furrow at speeds in excess of the rate of gravity (6-12 mph), such as that shown in FIG. 5, have different protection requirements when compared to traditional planting equipment. For example, a delivery belt 30 that carries seed to the furrow can also pick up field residue and pull it into the seed tube 26 causing interference or interruption in the smooth motion of the belt 30 around the pulley(s) 32. This in turn can lead to damage to the delivery mechanism 24 and/or cause it to operate erratically leading to reduced performance.

To protect high-speed delivery systems 24, the conventional seed tube guard 27 employed in all prior known commercial designs includes an extension 29 expanded to wrap around the bottom of the seed delivery assembly 24, as shown for example in FIG. 4. The extension 29 has the effect of deflecting residue as the planter 10 moves forward and residue pieces are not as likely to be caught in the moving belt 30 where it is exposed to discharge seeds.

Because the seed tube guard 27 extension 29 is located below the seed delivery tube 26 it is very close to the soil surface as the row unit 12 is drawn across the field while planting. In certain known designs, the lower end of the seed tube guard 27 will operate within the seed furrow created by the disk opener blades 14 positioned directly in front of the seed tube guard 27 and the seed delivery tube 26.

Additionally, if the planter row unit 12 is lowered to the ground before there is forward motion, and therefore no seed furrow is formed below the seed tube guard 27, the seed tube guard 27 will sit directly on the ground and support the entire weight of the row unit 12 and any additional down-force that is supplied. Then, as the row unit 12 is drawn forward, the weight of the row unit 12 plus the rearward drag is transferred to the row unit 12 attachment location for the seed tube guard 27. Damage to the structure of the row unit 12 can occur because many row units 12 are not intended to survive this type of loading.

Further, because the seed tube guard 27 must have sufficient structure to withstand weight set upon it, the portion of the guard 27 below the seed delivery tube 26 must be thick. This necessary thickness limits the location of the lowest point of the seed delivery tube 26, which may decrease the accuracy of seed placement. If positioned in the furrow just formed by the disk opener blades 14, the seed tube guard 27 lower structure can disturb the furrow shape and also wear prematurely due to soil abrasion.

Further, ground forces also create higher side loads on the disc opener discs 14 when planting at high speed. These side loads need to be resisted by the seed tube guard 27 in order to give it a usable life. To accomplish this the seed tube guard 27 may include high wear resistant surfaces 31 located at the lowest end of the seed tube guard 27 and designed to contact the inner surfaces of the opener discs 14. This added support improves the life of the opener discs 14 and the disc bearings, but also introduces rearward drag due to friction and the rotation of the opening discs 14. These forces can also add stress to the mounting locations of the seed tube guard 27.

There is a need in the art for improved devices for protecting seed tubes and seed delivery assemblies, particularly those in use with high-speed planting.

BRIEF SUMMARY

Disclosed herein are various row units and components thereof for shielding seed delivery components.

In Example 1, a seed delivery system shield, comprising a shield body, a side retention apparatus configured to maintain alignment of the shield body to a seed tube, and a spring plate shaped to be at least partially engaged with a rear portion of the shield body and extending rearward beneath the seed tube.

Example 2 relates to the shield of Example 1, wherein the spring plate is high carbon spring steel.

Example 3 relates to the shield of Example 1, wherein the spring plate further comprises a first portion shaped to be fitted with a side of the shield body, a second portion forming a radius connecting the first portion and a third portion, and the third portion extending from the second portion opposite the shield body.

Example 4 relates to the shield of Example 3, wherein the first portion of the spring plate is configured to act as a lever against forced exerted on the third portion of the spring plate.

Example 5 relates to the shield of Example 3, wherein the third portion of the spring plate is substantially flat.

Example 6 relates to the shield of Example 3, wherein the second portion of the spring plate is wrapped at partially around a spring pin.

Example 7 relates to the shield of Example 3, wherein the spring plate further comprises an elongated aperture centrally located along the second portion.

Example 8 relates to the shield of Example 1, wherein the shield body further comprises a tang configured to retain a spring pin.

Example 9 relates to the shield of Example 8, wherein the spring pin and the spring plate are configured to cooperate to prevent undue loading on a row unit.

Example 10 relates to the shield of Example 1, further comprising one or more wear pads on the shield body.

Example 11 relates to the shield of Example 10, wherein the one or more wear pads are carbide.

In Example 12 a shield for protecting a seed delivery system, comprising a shield body, a spring plate, and a spring pin configured to hold the spring plate to the shield body wherein deflection of the spring plate occurs at the second portion of the spring plate and the spring pin. The spring plate comprising a first portion shaped to be engaged with a rear portion of the shield body, a second portion extending rearwardly from the first portion to below a seed tube of the seed delivery system, and a third portion connecting the first portion and the second portion of the spring plate.

Example 13 relates to the shield of Example 12, wherein the spring plate deflects vertically.

Example 14 relates to the shield of Example 12, wherein the spring plate prevents field residue from being picked up by the seed delivery system.

Example 15 relates to the shield of Example 12, further comprising a side retention device extending from the shield body and configured to maintain alignment of the shield and the seed tube.

Example 16 relates to the shield of Example 12, wherein the second portion is substantially flat.

Example 17 relates to the shield of Example 12, wherein the shield body comprises a tang extending through an elongate aperture in the third portion to retain the spring pin.

Example 18 relates to the shield of Example 12, wherein row unit loading is at least partially absorbed by the spring pin and the spring plate.

Example 19 relates to the shield of Example 12, further comprising one or more wear pads on the shield body.

In Example 20 a seed tube shield for use on an agricultural row unit, comprising a shield body, a spring plate, a tang extending from the shield body configured to retain a spring pin and extend through an elongate aperture in the third portion, at least two wear pads, disposed on opposing sides of the shield body, and a retention device extending rearwardly from the shield body configured to maintain alignment of a seed tube. The spring plate comprising a first portion shaped to be engaged with a rear portion of the shield body, a second portion extending rearwardly from the first portion, and a third portion connecting the first portion and the second portion of the spring plate.

While multiple embodiments are disclosed, still other embodiments of the disclosure will become apparent to those skilled in the art from the following detailed description, which shows and describes illustrative embodiments of the invention. As will be realized, the disclosure is capable of modifications in various obvious aspects, all without departing from the spirit and scope of the disclosure. Accordingly, the drawings and detailed description are to be regarded as illustrative in nature and not restrictive.

DETAILED DESCRIPTION

The devices and methods described herein relate to protecting planter row units and components thereof, particularly seed delivery components. Various shield implementations described herein are directed to addressing numerous issues identified above including undesirable loading of the row unit structure while preventing field residue from being picked up by an exposed seed delivery belt.

Figure 1:
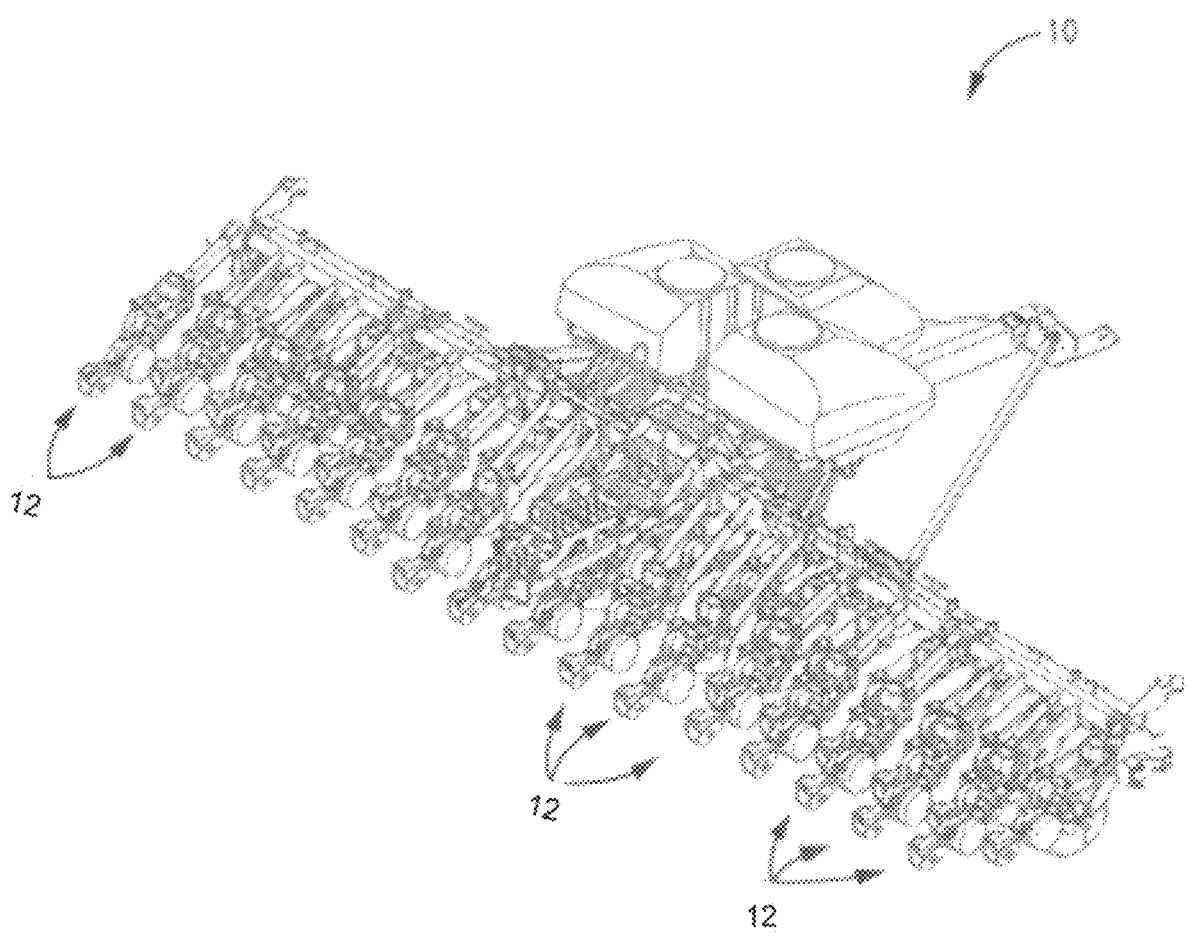
FIG. 1 is a perspective view of a planter, according to one implementation.
Figure 2:
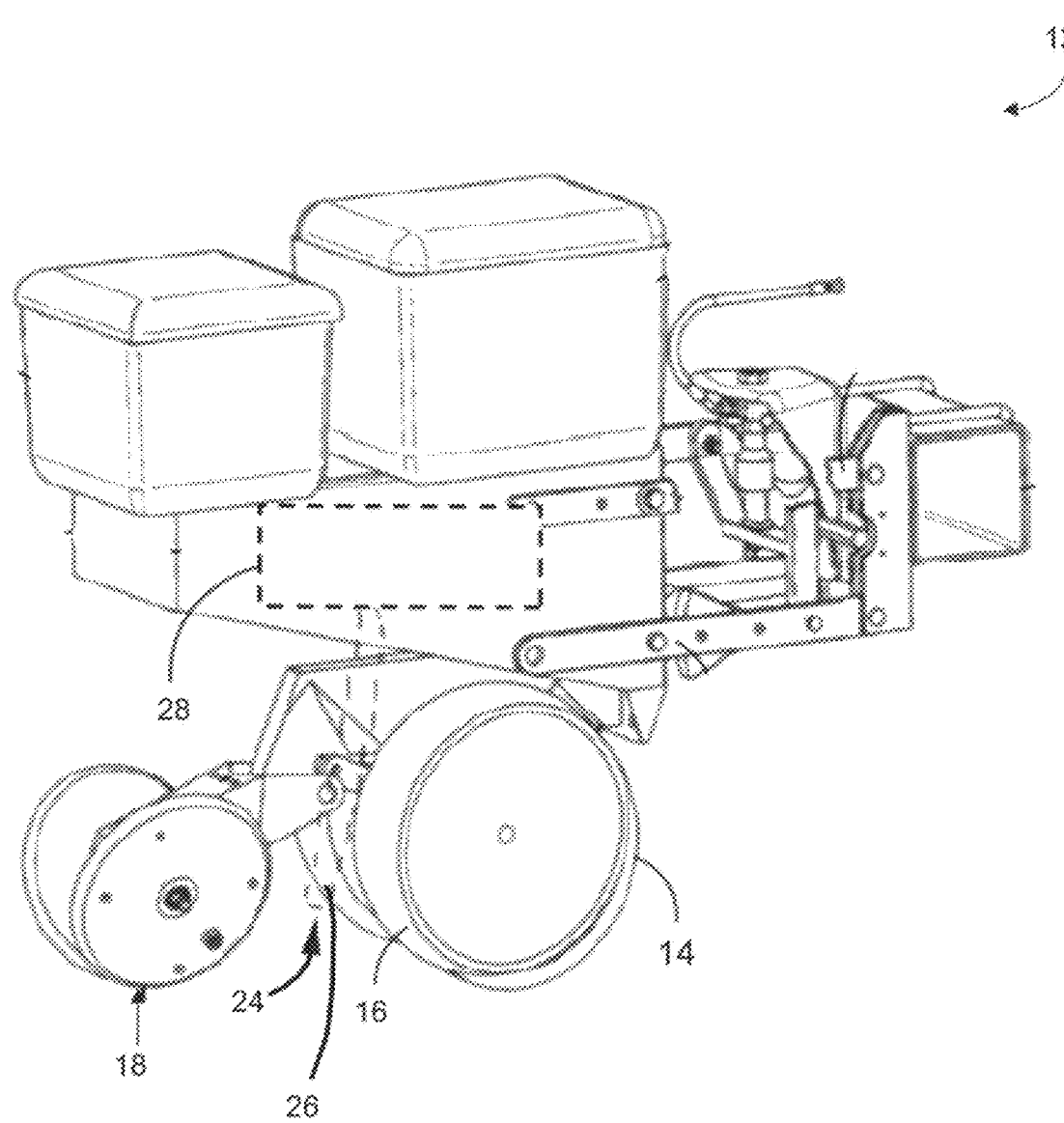
FIG. 2 is a side view of a planter row unit, according to one implementation.
Figure 3:
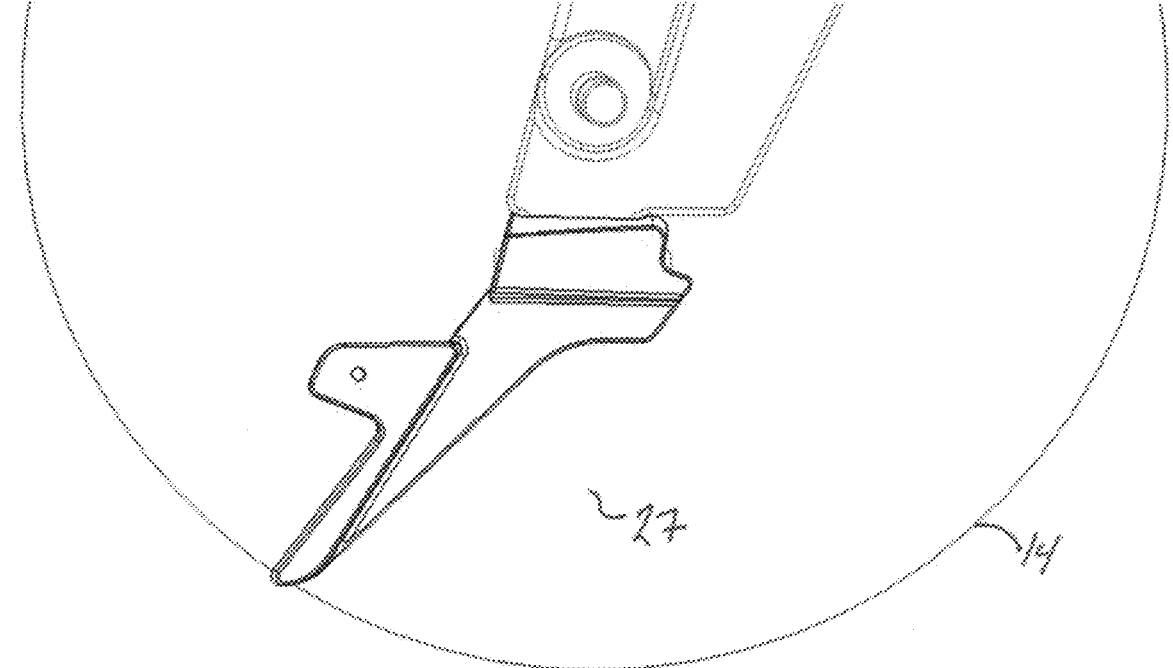
FIG. 3 is a side view of a conventional seed tube shield not intended for high-speed planting.
Figure 4:
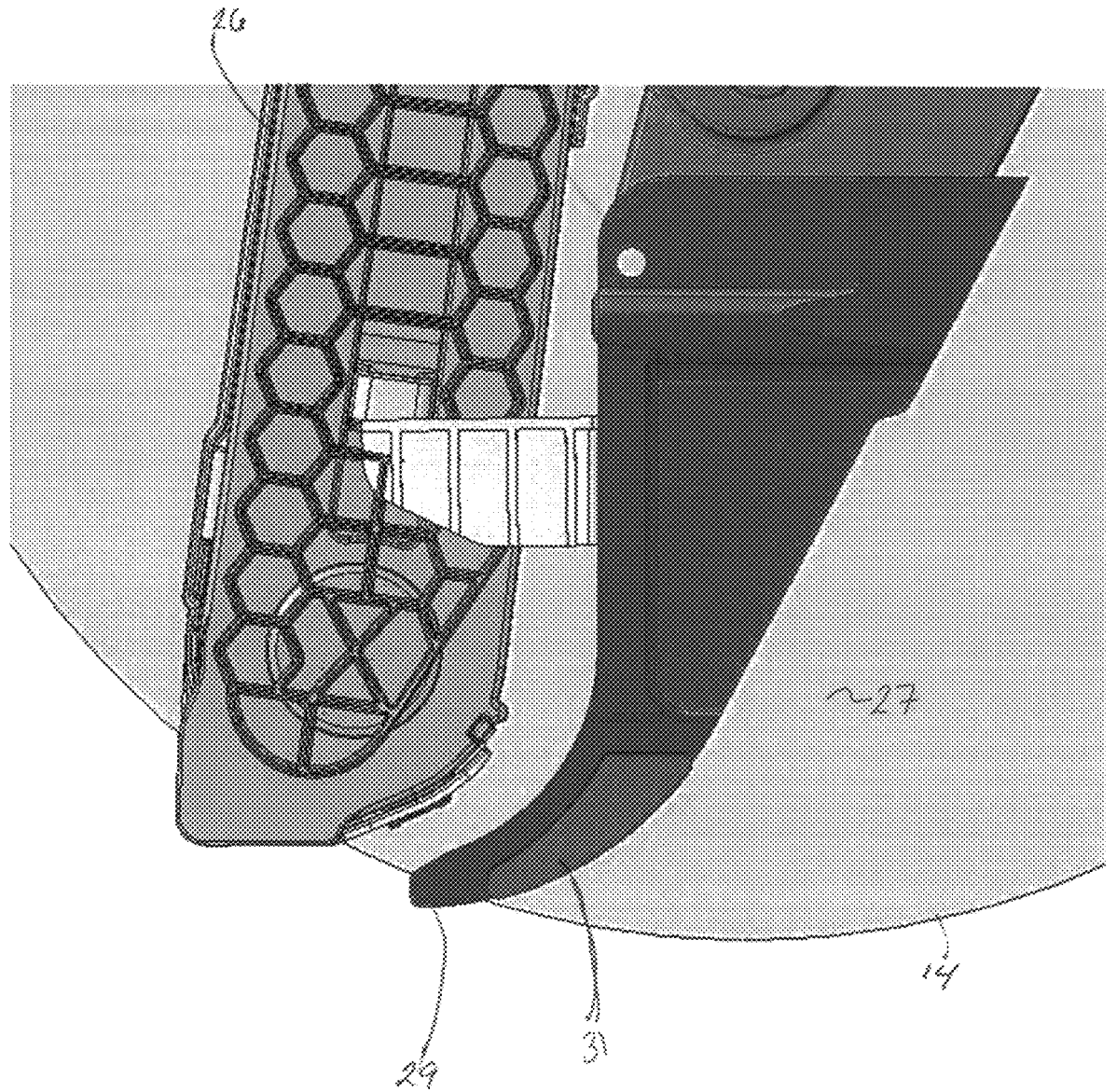
FIG. 4 is a side view of a prior known seed delivery shield with a structure that wraps below the seed delivery mechanism.
Figure 5:
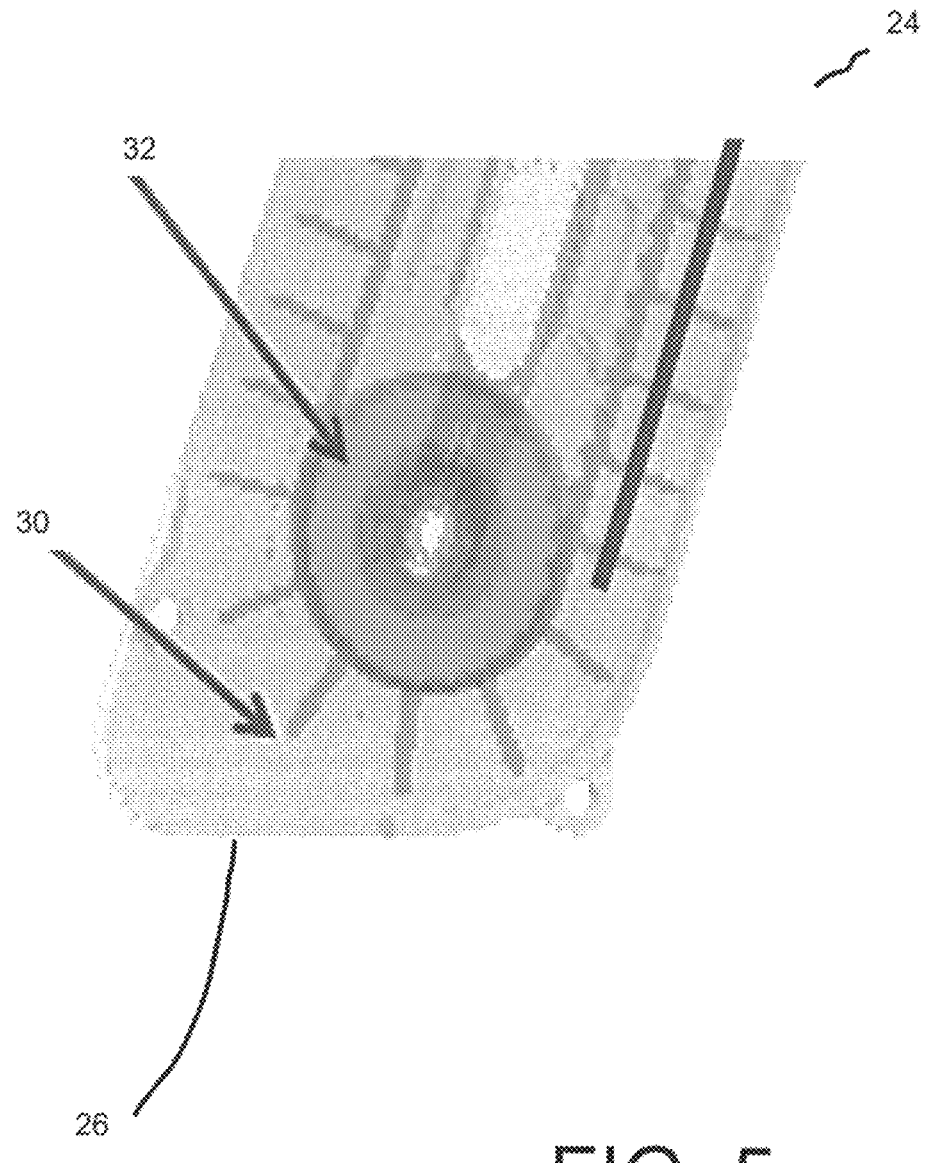
FIG. 5 is a cross-sectional view of a seed tube, according to one implementation.
Figure 6:
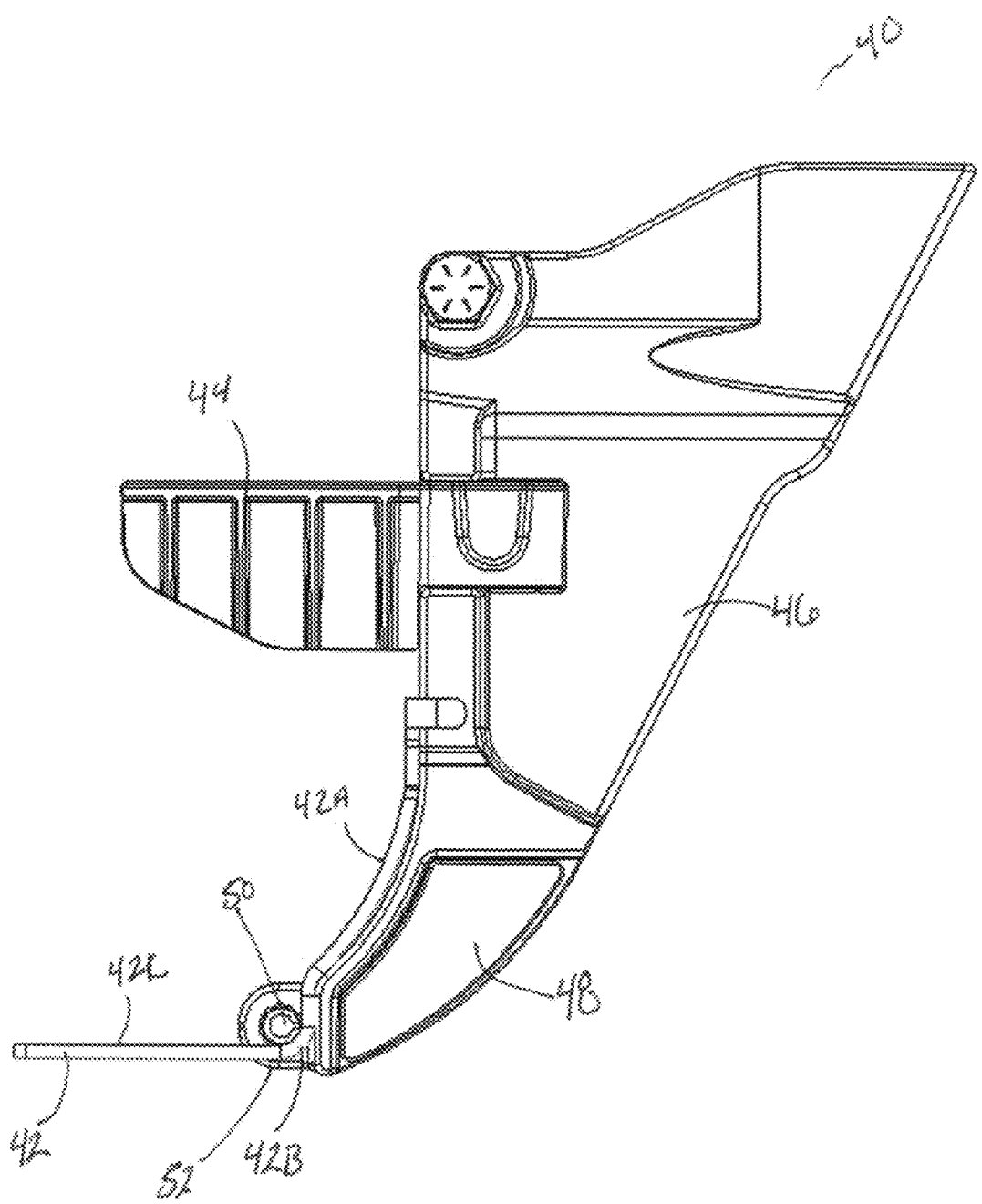
FIG. 6 is a side view of a seed tube shield, according to one implementation.

Turning now to the figures in more detail, in various implementations, the shield 40 includes a spring plate 42, a body 46, and side retention device 44, shown for example in FIG. 6. In these implementations, a properly formed spring plate 42 and spring pin 50 cooperate to prevent undue loading on the row unit structure while preventing field residue from lifting off the soil surface until the seed is planted. In these and other implementations, the side retention device 44 is configured to maintain the alignment of the seed tube 26 and the seed delivery shield 40, as would be readily appreciated.

Figure 7A:
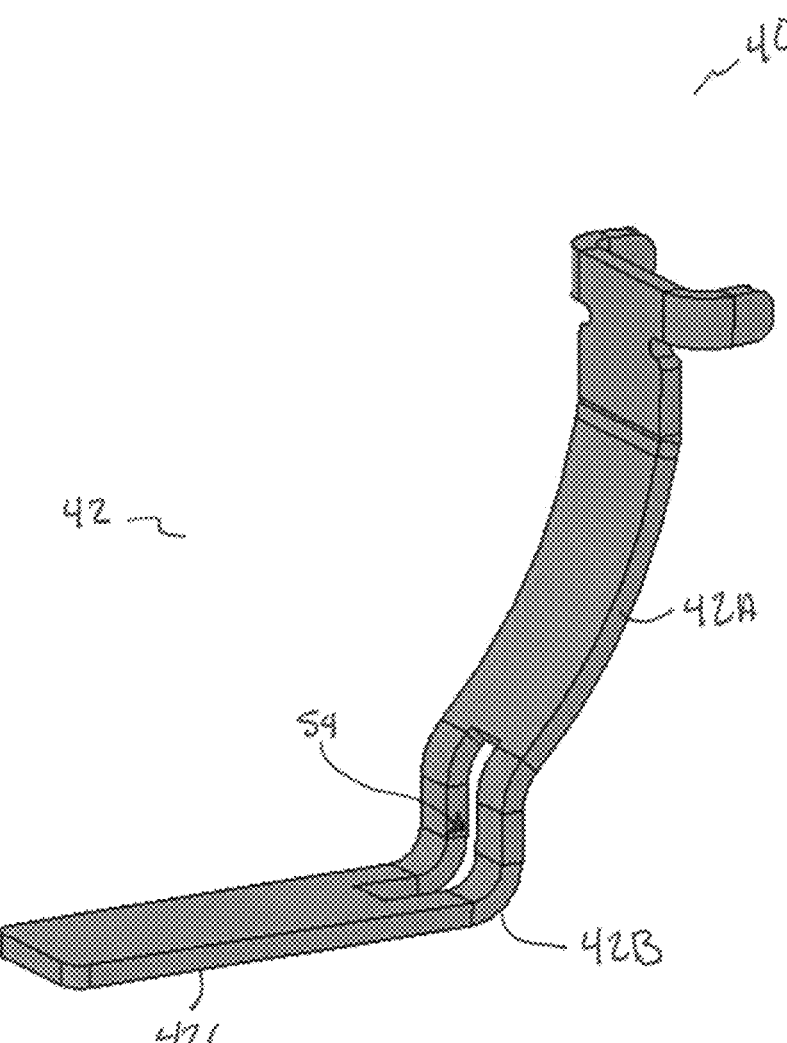
FIG. 7A shows a perspective view of the spring plate, according to one implementation.
Figure 7B:
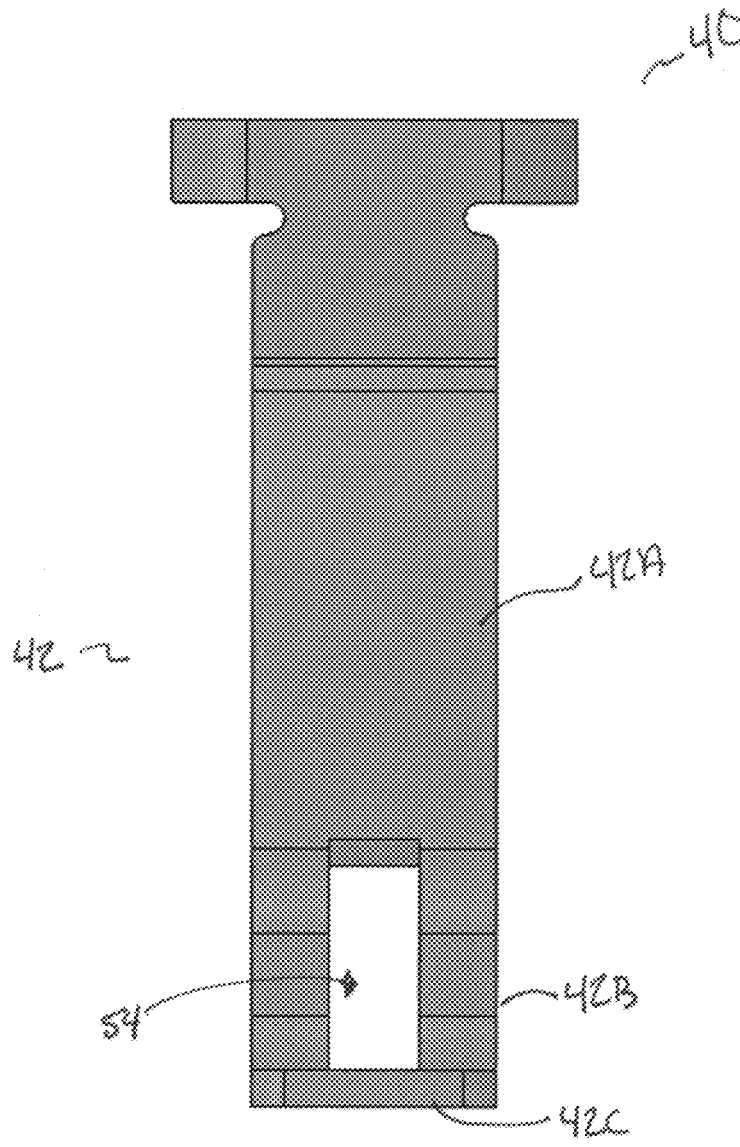
FIG. 7B show a rear view of the spring plate, according to one implementation.
Figure 7C:
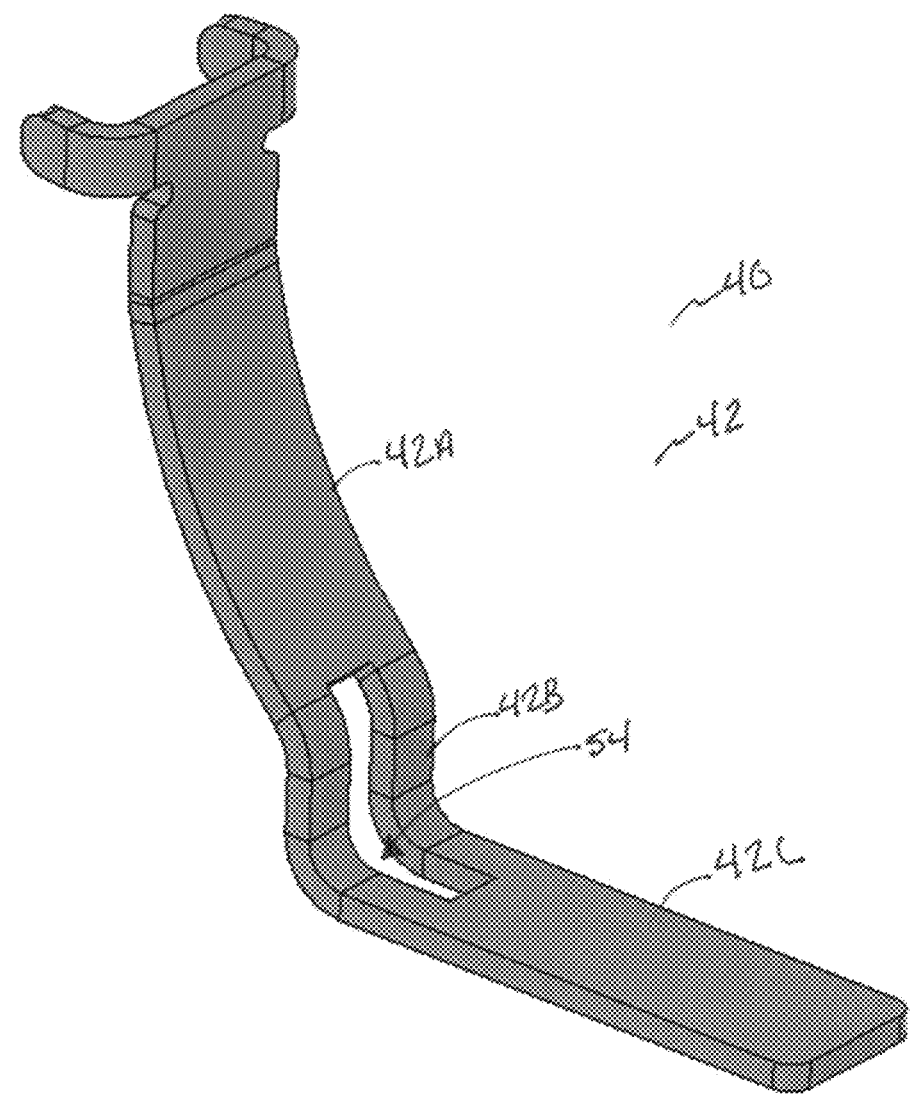
FIG. 7C shows a perspective view of the spring plate, according to one implementation.
Figure 8A:
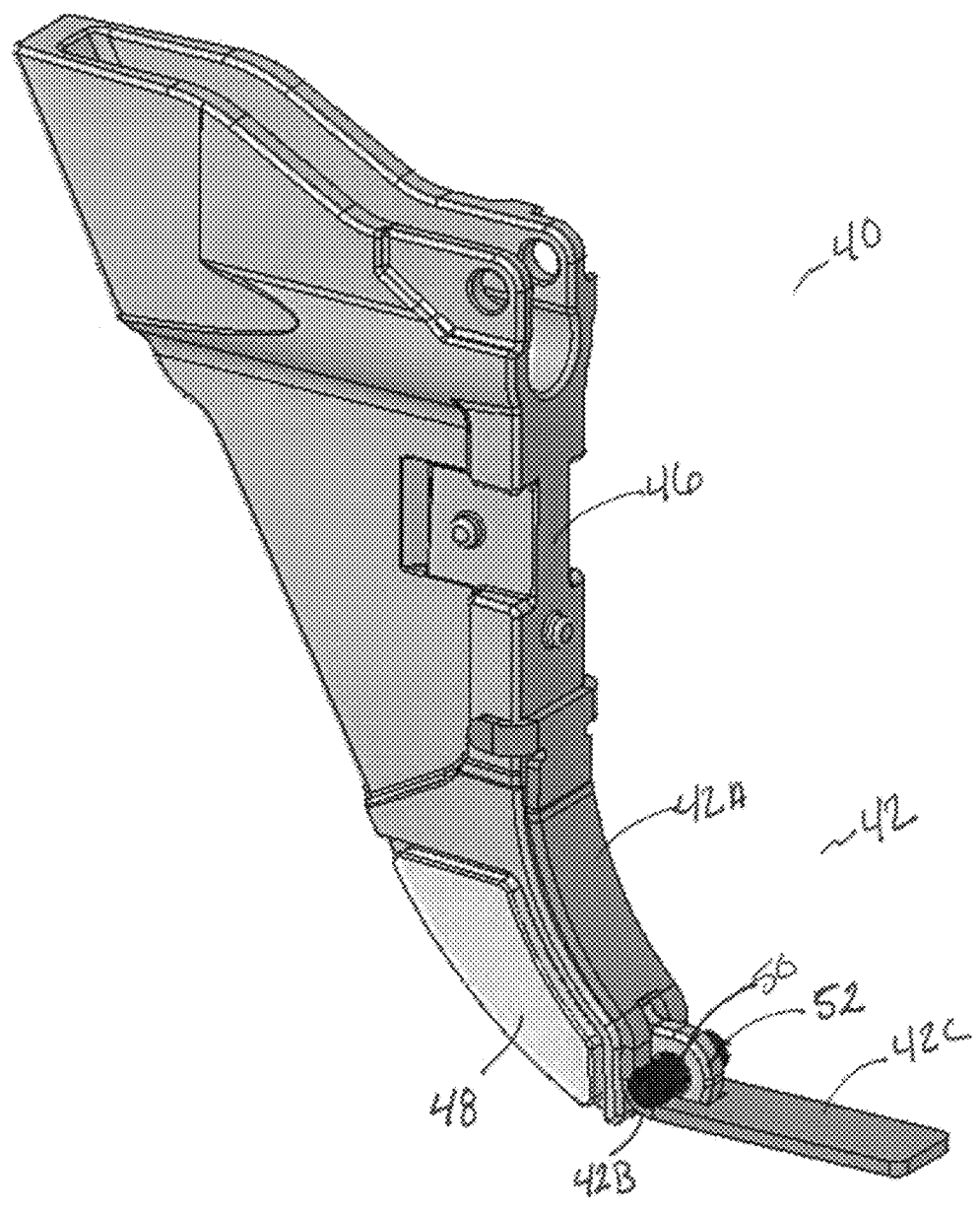
FIG. 8A shows a perspective view of a seed tube shield, according to one implementation.
Figure 8B:
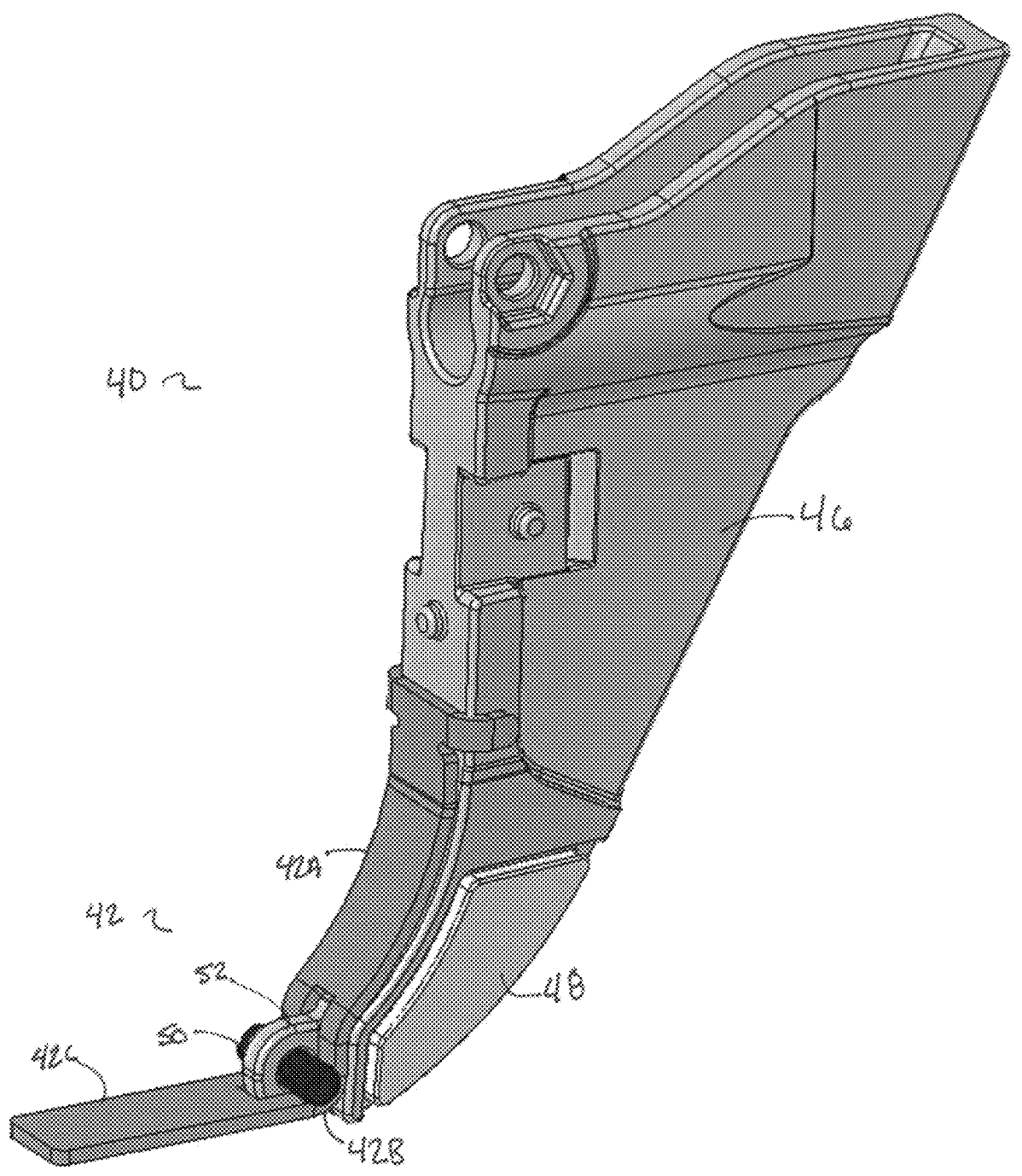
FIG. 8B shows a perspective view of a seed tube shield, according to one implementation.
Figure 8C:
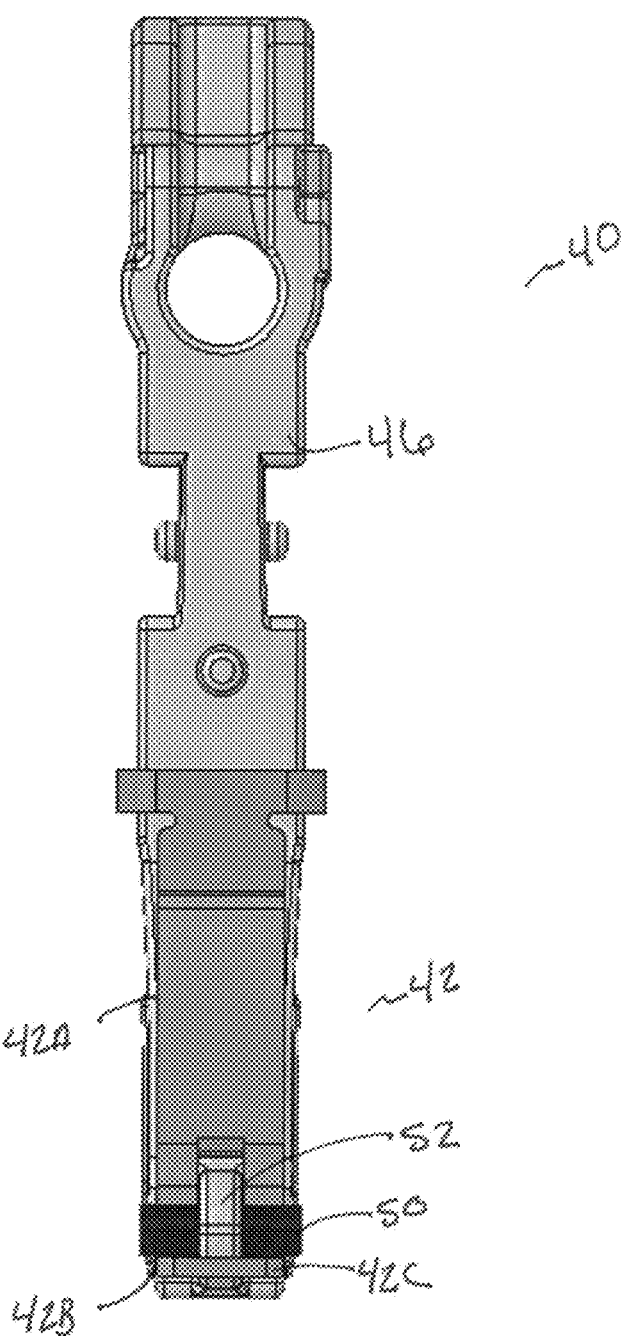
FIG. 8C shows a rear view of a seed tube shield, according to one implementation.
Figure 8D:
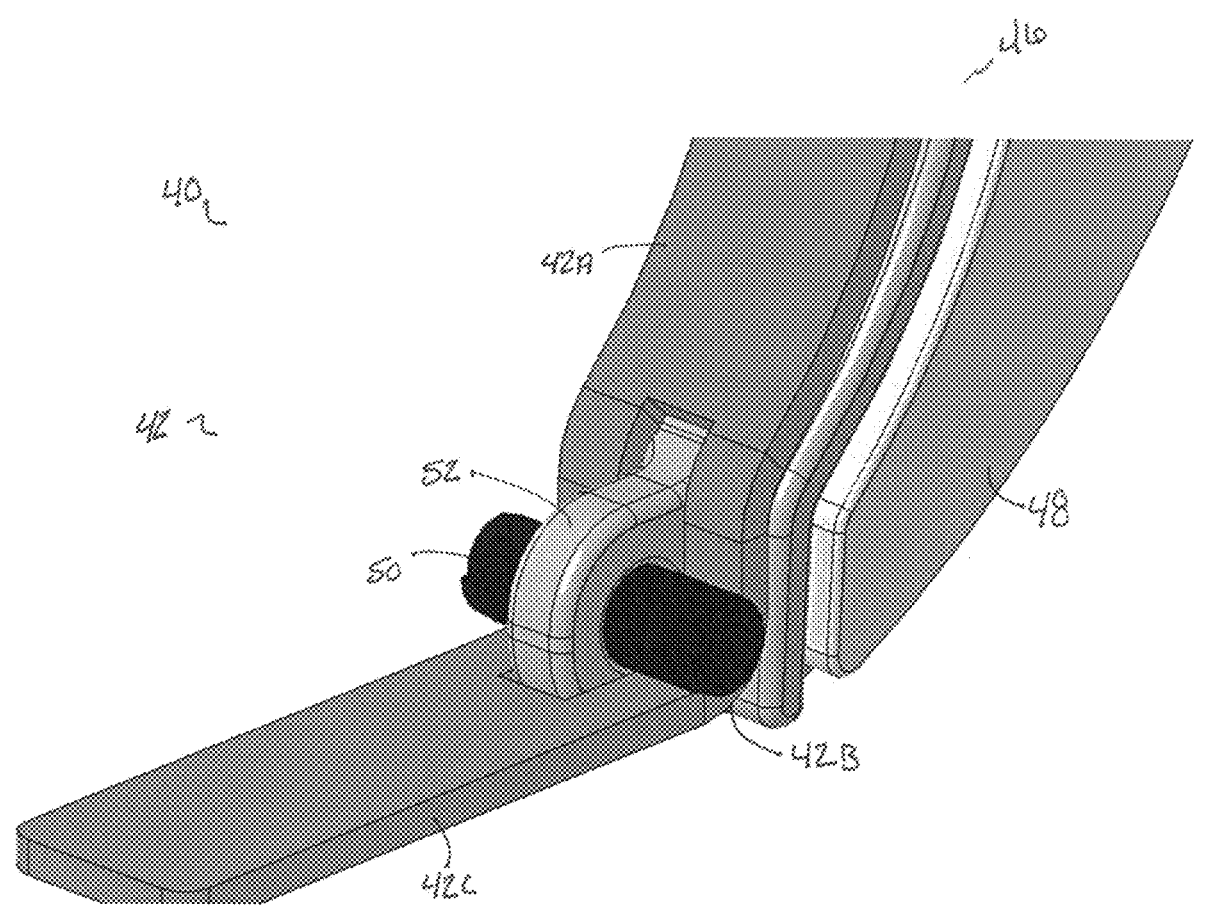
FIG. 8D shows a close-up, perspective view of a spring plate on a seed tube shield, according to one implementation.
Figure 8E:
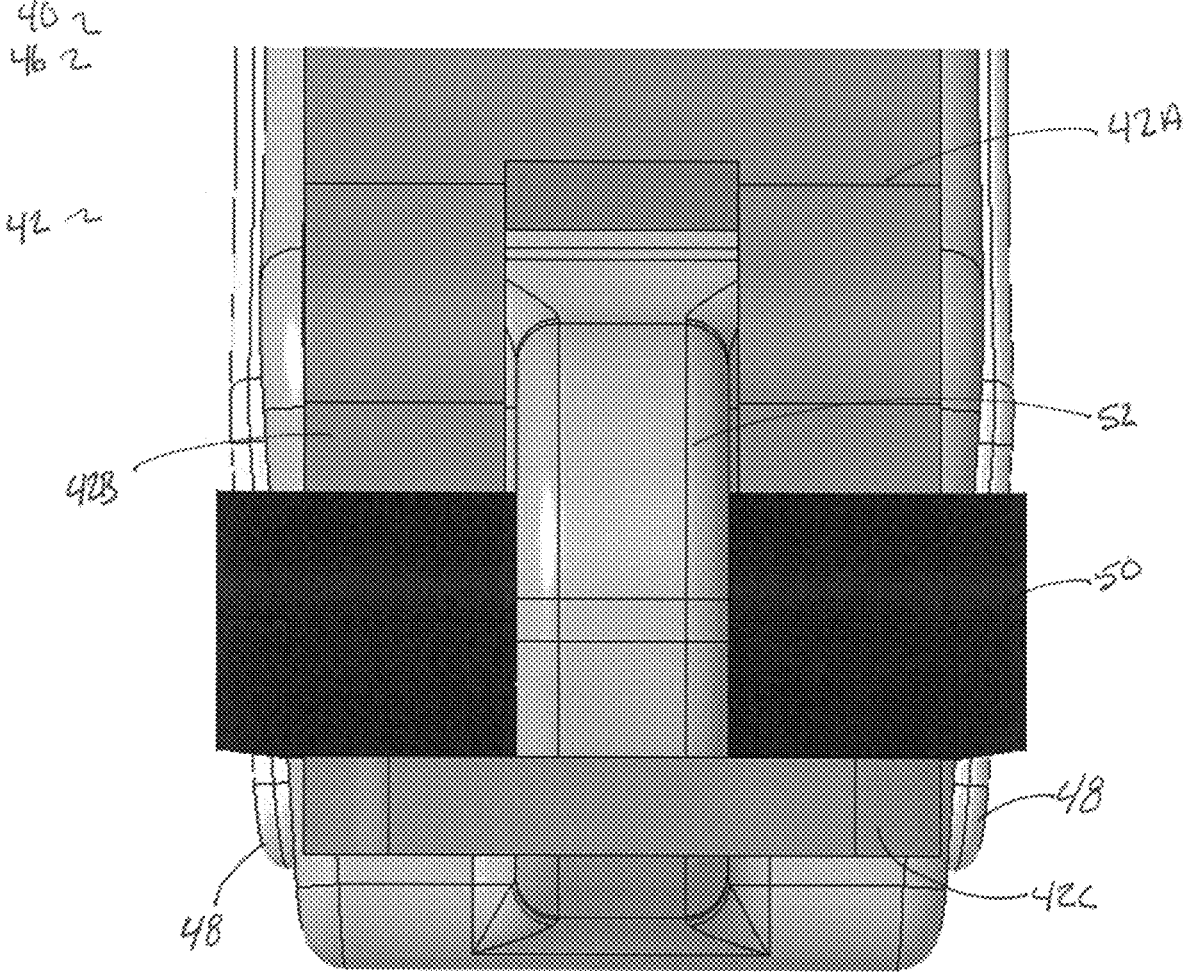
FIG. 8E shows a close-up, rear view of a spring plate on a seed tube shield, according to one implementation.
Figure 8F:
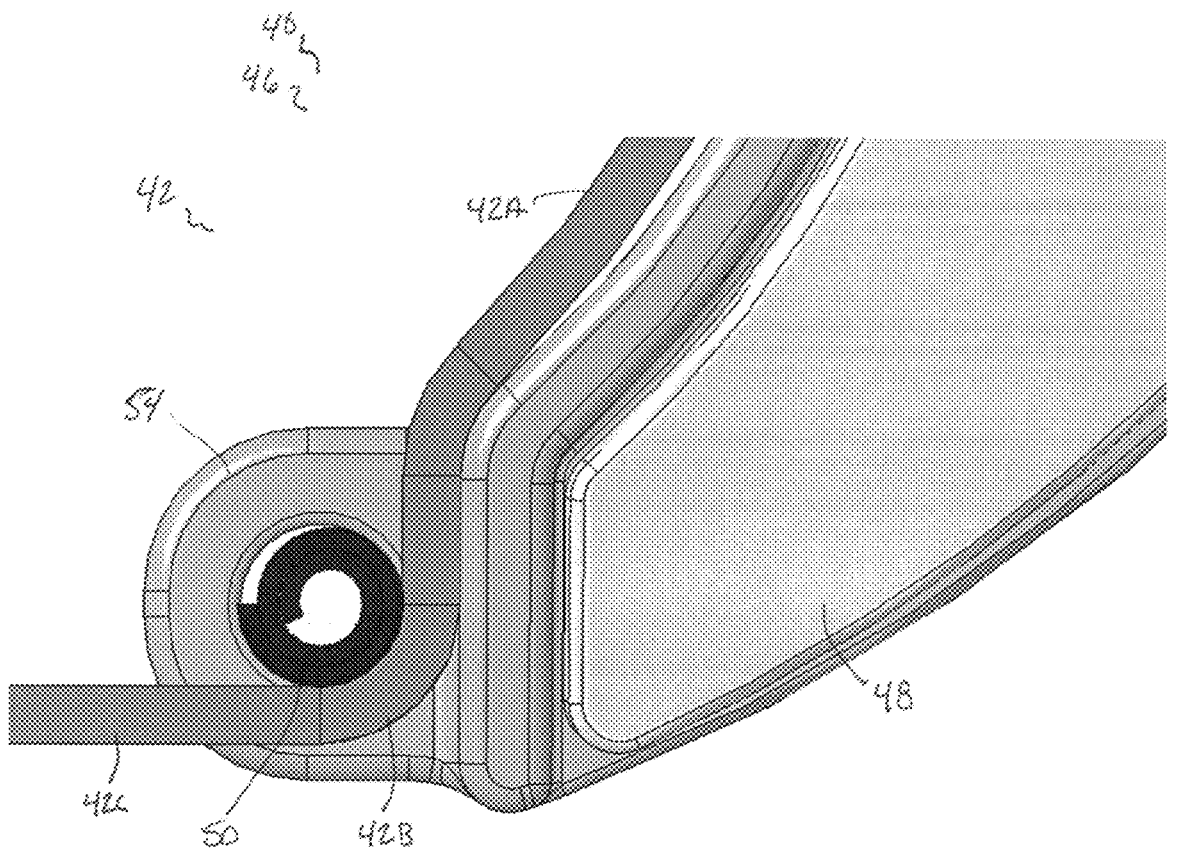
FIG. 8F shows a close-up, side view of a spring plate on a seed tube shield, according to one implementation.
Figure 9:
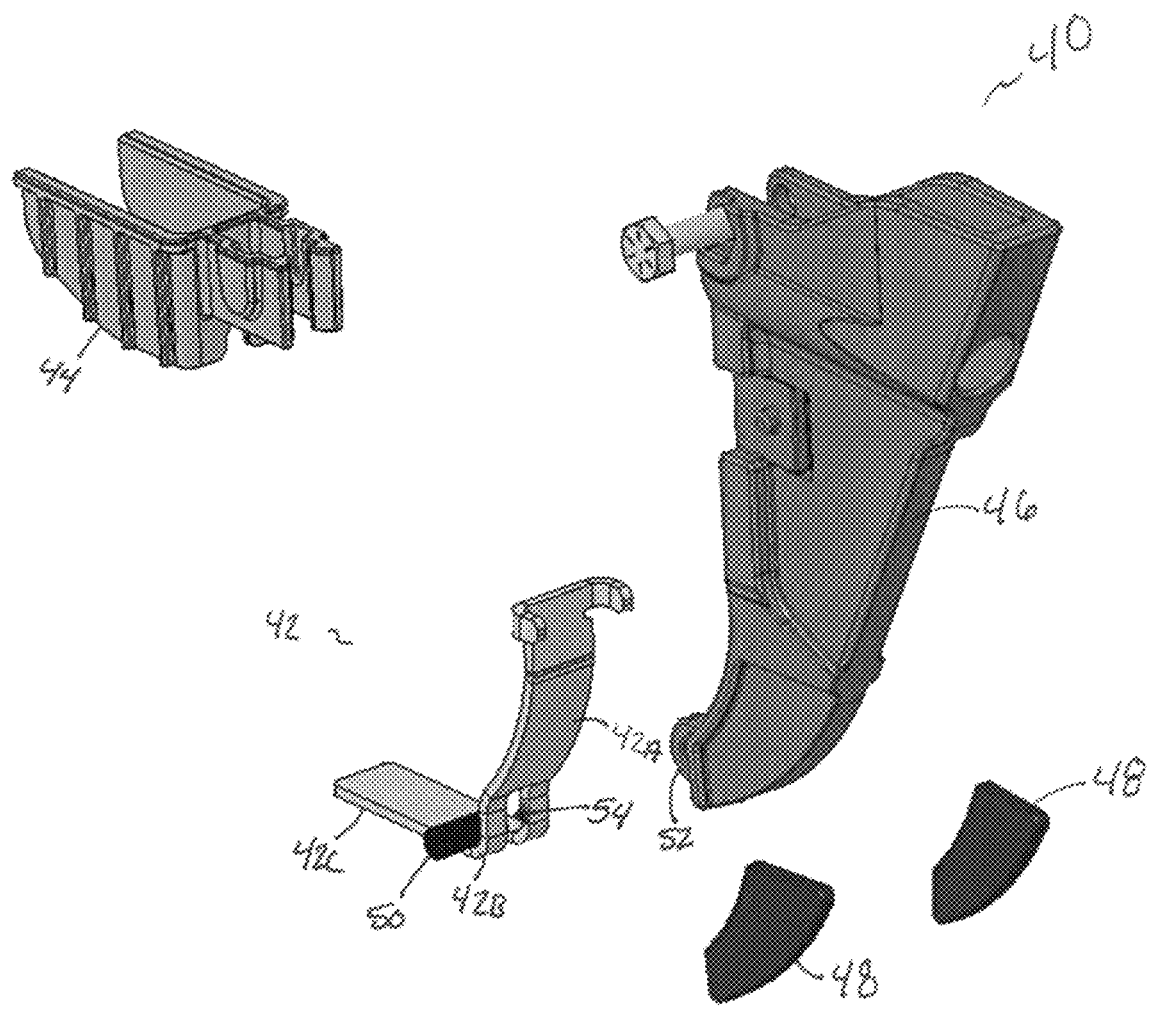
FIG. 9 is an exploded view of a seed tube shield, according to one implementation.

In various implementations, the spring plate 42 is a resilient wear resistant part shaped to fit with and follow the contour of the rear side of the body 46 of the seed tube shield 40 and extend rearward below a seed tube 24. In certain implementations, the spring plate 42 is made from thin high carbon spring steel or other appropriate material, as would be appreciated. In various implementations, the spring plate 42 includes an upper curved portion 42A, a formed radius 42B, and an extension 42C portion, shown variously in FIGS. 7A-7C. In these and other implementations, the upper curved portion 42A is shaped to maintain maximum physical clearance with the seed tube shield 40 and act as a lever to react against any upward forces imparted to the extension 42C of the spring plate 42, such as by field residue, rearward drag from advancing the row unit, weight of the row unit or downforce applied to the row unit when resting on unopened soil. As would be appreciated, the spring plate 42, provides protection for the lower end of the seed delivery tube. This includes protection from picking up field residue, soil, etc. The spring plate 42 also deflects debris, like rocks, that might impact the lower end of the delivery tube and is sacrificial.

It would further be appreciated that the spring plate 42 can, in various implementations, be inexpensive and easily replaced. In various implementations, the spring plate 42 may be easily replaced by removing the spring pin 50, removing the spring plate 42 from the shield body 46 and then placing a new spring plate 42 on the shield body 46 and replacing the spring pin 50. In these and other implementations, the spring plate 42 can be replaced without removed the shield body 46 from the row unit. Various alternative methods and mechanisms for replaying the spring plate 42 are possible and would be appreciated.

As shown in FIGS. 8A-F and 9, in certain implementations, the body 46 includes optional common features such as carbide or other wear pads 48 to support the disc opener blades 14 that are located to either side on a planter row unit 12. In various implementations, the one or more wear pads 48 are located on a lower portion of the shield body 46 anterior to the spring plate 42, though alternate configurations are of course possible.

Figure 10:
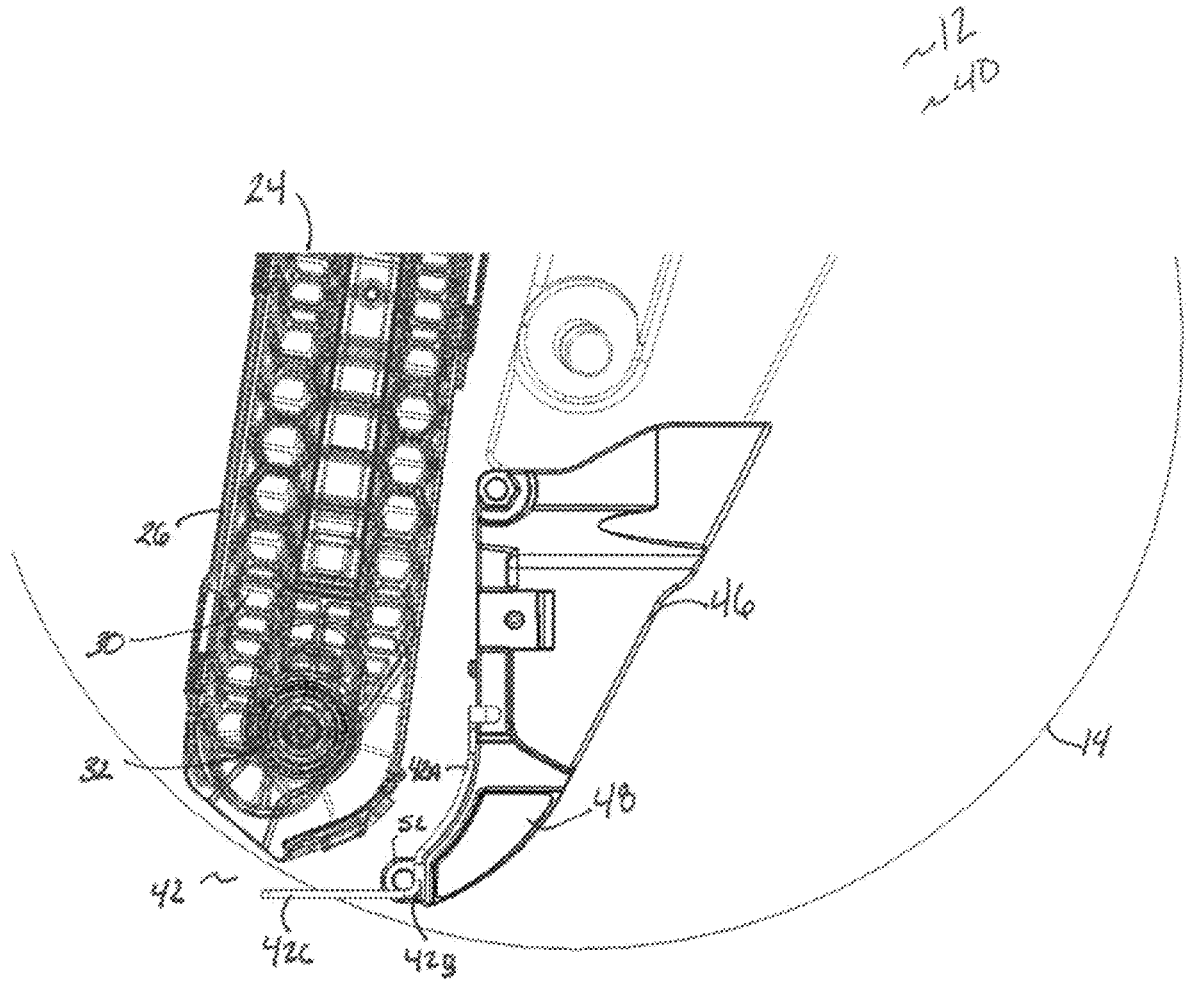
FIG. 10 is a side schematic view of a seed tube shield with seed tube, according to one implementation.

Continuing with FIGS. 8A-F and 9, in various implementations, the extension 42C is a substantially flat portion of the spring plate 42 that projects rearward from the shield body 46 and below the seed delivery tube 26, shown for example in FIG. 10. In these implementations, the rearward projection/extension 42C of the spring plate 42 includes a spring pin 50.

As shown generally in FIGS. 6-10, in certain implementations, a formed radius 42B wraps at least partially around spring pin 50. In these implementations, any deflection of the spring plate 42 occurs at the junction of radius 42B and the outside dimeter of spring pin 50. The formed radius 42B wrapping around the spring pin 50 reduces the concentration of stresses due to deflection of the spring plate 42 as it passes over obstacles, debris, etc. Reducing the stress increases the service life of the row unit, shield 40, and spring pin 50.

In various implementations, a tang 52 is part of the structure of the body 46 of the seed delivery shield 40. The tang 52 locates and retains the spring pin 50 and the spring plate 42 by intersecting the spring plate 42 along an elongated aperture 54. In these implementations, the spring plate 42 is retained in all planes but is allowed to deflect vertically.

The spring plate 42 acts such that any upward loading due to field impact or sitting on the soil surface when the planter row unit is lowered is at least partially absorbed by the spring pin 50 and spring plate 42. In these implementations, the impact/weight is not fully transferred to the mounting location of the seed tube guard 40 on the row unit.

Further, due to the length of the spring plate 42 extending beyond the seed exit point on the delivery tube 26, debris ingression into the delivery tube 26 is minimized, as would be readily appreciated. Alternate configurations are of course possible.

Although the disclosure has been described with references to various embodiments, persons skilled in the art will recognized that changes may be made in form and detail without departing from the spirit and scope of this disclosure.

What is claimed is:

1. A seed delivery system shield, comprising:
   (a) a shield body;
   (b) a side retention apparatus configured to maintain alignment of the shield body to a seed tube; and
   (c) a spring plate shaped to be at least partially engaged with a rear portion of the shield body and extending rearward beneath the seed tube, the spring plate comprising:
      (i) a first portion shaped to be fitted with a side of the shield body;
      (ii) a second portion forming a radius connecting the first portion and a third portion; and
      (iii) the third portion extending from the second portion opposite the shield body,
      wherein the shield body comprises a tang extending through an elongate aperture in the third portion to retain a spring pin.

2. The shield of claim 1, wherein the spring plate is high carbon spring steel.

3. The shield of claim 1, wherein the first portion of the spring plate is configured to act as a lever against forced exerted on the third portion of the spring plate.

4. The shield of claim 1, wherein the third portion of the spring plate is substantially flat.

5. The shield of claim 1, wherein the second portion of the spring plate is wrapped at least partially around the spring pin.

6. The shield of claim 1, wherein the spring pin and the spring plate are configured to cooperate to prevent undue loading on a row unit.

7. The shield of claim 1, further comprising one or more wear pads on the shield body.

8. The shield of claim 7, wherein the one or more wear pads are carbide.

9. A shield for protecting a seed delivery system, comprising:
   (a) a shield body;
   (b) a spring plate, comprising:
      (i) a first portion shaped to be engaged with a rear portion of the shield body;
      (ii) a second portion extending rearwardly from the first portion to below a seed tube of the seed delivery system; and
      (iii) a third portion connecting the first portion and the second portion of the spring plate,
   (c) a spring pin configured to hold the spring plate to the shield body,
   wherein deflection of the spring plate occurs at the second portion of the spring plate and the spring pin and wherein the shield body comprises a tang extending through an elongate aperture in the third portion to retain the spring pin.

10. The shield of claim 9, wherein the spring plate deflects vertically.

11. The shield of claim 9, wherein the spring plate prevents field residue from being picked up by the seed delivery system.

12. The shield of claim 9, further comprising a side retention device extending from the shield body and configured to maintain alignment of the shield and the seed tube.

13. The shield of claim 9, wherein the second portion is substantially flat.

14. The shield of claim 9, wherein row unit loading is at least partially absorbed by the spring pin and the spring plate.

15. The shield of claim 9, further comprising one or more wear pads on the shield body.

16. A seed tube shield for use on an agricultural row unit, comprising:

(a) a shield body;

(b) a spring plate, comprising:

(i) a first portion shaped to be engaged with a rear portion of the shield body;

(ii) a second portion extending rearwardly from the first portion; and (iii) a third portion connecting the first portion and the second portion of the spring plate;

(c) a tang extending from the shield body configured to retain a spring pin and extend through an elongate aperture in the third portion;

(d) at least two wear pads, disposed on opposing sides of the shield body; and (e) a retention device extending rearwardly from the shield body configured to maintain alignment of a seed tube.

* * * * *